United States Patent
Kim

(10) Patent No.: US 11,032,794 B2
(45) Date of Patent: Jun. 8, 2021

(54) METHOD AND DEVICE FOR UPDATING SYSTEM INFORMATION IN WIRELESS COMMUNICATION SYSTEM

(71) Applicant: Samsung Electronics Co., Ltd., Suwon-si (KR)

(72) Inventor: Sangbum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/332,504

(22) PCT Filed: Sep. 12, 2017

(86) PCT No.: PCT/KR2017/010003
§ 371 (c)(1),
(2) Date: Mar. 12, 2019

(87) PCT Pub. No.: WO2018/052233
PCT Pub. Date: Mar. 22, 2018

(65) Prior Publication Data
US 2019/0223153 A1  Jul. 18, 2019

(30) Foreign Application Priority Data
Sep. 13, 2016 (KR) .................. 10-2016-0118401

(51) Int. Cl.
*H04W 68/02* (2009.01)
*H04W 48/08* (2009.01)
(Continued)

(52) U.S. Cl.
CPC ........... *H04W 68/02* (2013.01); *H04W 48/08* (2013.01); *H04W 76/27* (2018.02); *H04W 76/28* (2018.02)

(58) Field of Classification Search
CPC ..... H04W 68/02; H04W 76/26; H04W 76/27; H04W 36/00; H04W 48/08
See application file for complete search history.

(56) References Cited

U.S. PATENT DOCUMENTS 10,091,762 B2 * 10/2018 Kitazoe ................. H04W 68/02
10,616,822 B2 *  4/2020 Kubota ................. H04W 48/14
(Continued)

FOREIGN PATENT DOCUMENTS

WO    2015016530 A1    2/2015
WO    2016/022748 A1    2/2016

OTHER PUBLICATIONS

"Issue on Extended Paging Cycle in RRC_IDLE", 3GPP Draft; R2-132490, Issues on extended paging cycle_R1, vol. RAN WG2, No. Barcelona, Aug. 9, 2013, XP050718194. (Year: 2013).*
(Continued)

*Primary Examiner* — Andrew Lai
*Assistant Examiner* — Mohammed M Murshid

(57) ABSTRACT

Disclosed is a 5G or pre-5G communication system for supporting a data transmission rate higher than that of a 4G communication system, such as LTE. According to the present invention, a method of a terminal comprises the steps of: receiving a paging message in a second section, when a second DRX operating in a second period having a longer period than a first period is set in the terminal; confirming whether a system information change indicator related to the second DRX is included in the paging message; and updating first system information, which includes paging message-related information, when the system information change indicator is included in the paging message.

16 Claims, 17 Drawing Sheets

(51) Int. Cl.
    *H04W 76/28*     (2018.01)
    *H04W 76/27*     (2018.01)

(56) References Cited

U.S. PATENT DOCUMENTS

| | | | | |
|---|---|---|---|---|
| 2009/0310503 | A1* | 12/2009 | Tenny | H04W 68/02 370/252 |
| 2009/0316603 | A1* | 12/2009 | Amerga | H04W 48/08 370/254 |
| 2010/0330992 | A1 | 12/2010 | Bhattacharjee et al. | |
| 2012/0276933 | A1* | 11/2012 | Laitinen | H04W 68/025 455/458 |
| 2014/0302855 | A1* | 10/2014 | Nory | H04W 52/0206 455/437 |
| 2014/0362752 | A1 | 12/2014 | Jha et al. | |
| 2015/0098381 | A1 | 4/2015 | Cucala Garcia | |
| 2016/0044578 | A1 | 2/2016 | Vajapeyam et al. | |
| 2016/0044605 | A1* | 2/2016 | Vajapeyam et al. | |
| 2016/0112948 | A1 | 4/2016 | Liang et al. | |
| 2016/0192323 | A1 | 6/2016 | Kim et al. | |
| 2016/0192434 | A1* | 6/2016 | Du | H04W 76/28 370/329 |
| 2016/0295504 | A1* | 10/2016 | Wang | H04W 72/0473 |
| 2017/0127470 | A1* | 5/2017 | Vajapeyam | H04W 68/02 |
| 2018/0007733 | A1* | 1/2018 | Mochizuki et al. | |
| 2018/0124685 | A1* | 5/2018 | Jha | H04W 48/10 |

OTHER PUBLICATIONS

Intel Corporation: "Email discussion report on [91#32][LTE/eDRX] eDRX and H-SFN range", 3GPP Draft; R2-154294_EMAIL-Discussion_91-32_EDRX_H-SFN, vol. RAN WG2, No. Malmo, Oct. 4, 2015, XP051004844. (Year: 2015).*
IIntel Corporation, Email discussion report on [91#32][LTE/eDRX] eDRX and H-SFN range: 3GPP Draft: R2-154294 (Year: 2015).*
LG Electronics Inc., "Issues on Extended Paging Cycle in RRC_IDLE", 3GPP TSG-RAN WG2 #83, Aug. 19-23, 2013, 3 pages.
Intel Corporation, "Email discussion report on [91#32][LTE/eDRX] eDRX and H-SFN range", 3GPP TSG RAN WG2 Meeting #91bis, Oct. 5-9, 2015, 19 pages.
Nokia Networks, "RAN impacts with extended DRX cycle", 3GPP TSG-RAN WG2 Meeting #90, May 25-29, 2015, 3 pages.
Supplementary European Search Report dated Apr. 30, 2019 in connection with European Patent Application No. 17 85 1107, 14 pages.
ISA/KR, "International Search Report and Written Opinion of the International Searching Authority," International Application No. PCT/KR2017/010003, dated Dec. 15, 2017, 11 pages.

* cited by examiner

METHOD AND DEVICE FOR UPDATING SYSTEM INFORMATION IN WIRELESS COMMUNICATION SYSTEM

CROSS-REFERENCE TO RELATED APPLICATIONS

This application is a 371 National Stage of International Application No. PCT/KR2017/010003, filed Sep. 12, 2017, which claims priority to Korean Patent Application No. 10-2016-0118401, filed Sep. 13, 2016, the disclosures of which are herein incorporated by reference in their entirety.

BACKGROUND

1. Field

The disclosure relates to a wireless communication system. More specifically, the disclosure relates to a method and device for updating system information in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming MIMO, and array antennas. Application of a cloud Radio Access Network (RAN) as the above-described Big Data processing technology may also be considered to be as an example of convergence between the 5G technology and the IoT technology.

Meanwhile, in general, a wireless communication system has been developed to provide communication while securing a user's mobility. The wireless communication technology has recently been dramatically advanced, and thus the communication system technology continues to evolve. Such a wireless communication system has reached to provide high-speed data communication service in addition to voice communication with the help of the rapid development of the technology.

Small wearable devices or IoT devices recently emerge. Performance of the devices becomes high to provide the functions of the existing wireless communication terminal. In contrast, advanced power reduction performance becomes an important requirement because the size of a battery is smaller than that of the existing mobile communication terminal due to a reduced size. Furthermore, the mobile communication terminal needs to improve its power reduction performance due to the diversification of utilization, user convenience, etc.

A terminal may operate in discontinuous reception (DRX) in order to reduce power consumption. The terminal may perform a reception operation in order to reduce a paging signal from a base station. However, the paging signal is not frequently transmitted. Accordingly, if the terminal performs a reception operation up to the time when a paging signal is not received, a power loss increases. Accordingly, in order to reduce power consumption, the terminal may attempt to receive a paging signal by periodically performing a reception operation during a specific time period only. This may be called DRX.

Furthermore, in order to improve power consumption, a method of increasing the period of DRX is being discussed. This may be referred to as extended DRX (eDRX).

Meanwhile, a base station may notify a terminal that system information has been changed through a paging message. However, if extended DRX is applied, the paging message may not be received. The terminal may not be aware of whether system information has been changed. Accordingly, there is a need for a method for a terminal to be aware of whether system information has been changed.

SUMMARY

The disclosure provides a method for a terminal to effectively update changed system information by identifying whether system information has been changed when eDRX is applied.

A method of a terminal according to the disclosure includes receiving a paging message in a second period if the terminal has been configured as second DRX operating in a second cycle having a longer cycle than a first cycle, identifying whether a system information change indicator related to the second DRX has been included in the paging message, and updating first system information including paging message-related information if the system information change indicator has been included in the paging message.

A method of a base station according to the disclosure includes determining to update system information including first system information including paging message-related information, transmitting a paging message, including a system information change indicator related to second DRX, to a terminal in a second period if the terminal has been configured as the second DRX operating in a second cycle longer than a first cycle, and broadcasting the updated system information.

A terminal according to the disclosure includes a transceiver configured to transmit and receive signals and a controller configured to receive a paging message in a second period if the terminal has been configured as second DRX operating in a second cycle having a longer cycle than a first cycle, identify whether a system information change indicator related to the second DRX has been included in the paging message, and update first system information including paging message-related information if the system information change indicator has been included in the paging message.

A base station according to the disclosure includes a transceiver configured to transmit and receive signals and a controller configured to determine to update system information including first system information including paging message-related information, transmit a paging message, including a system information change indicator related to second DRX, to a terminal in a second period if the terminal has been configured as the second DRX operating in a second cycle longer than a first cycle, and broadcast the updated system information.

In accordance with the disclosure, through the methods proposed in the disclosure, a terminal can efficiently update system information and efficiently perform an eDRX operation by identifying whether system information has been changed when eDRX is applied.

DETAILED DESCRIPTION

Figure 1:
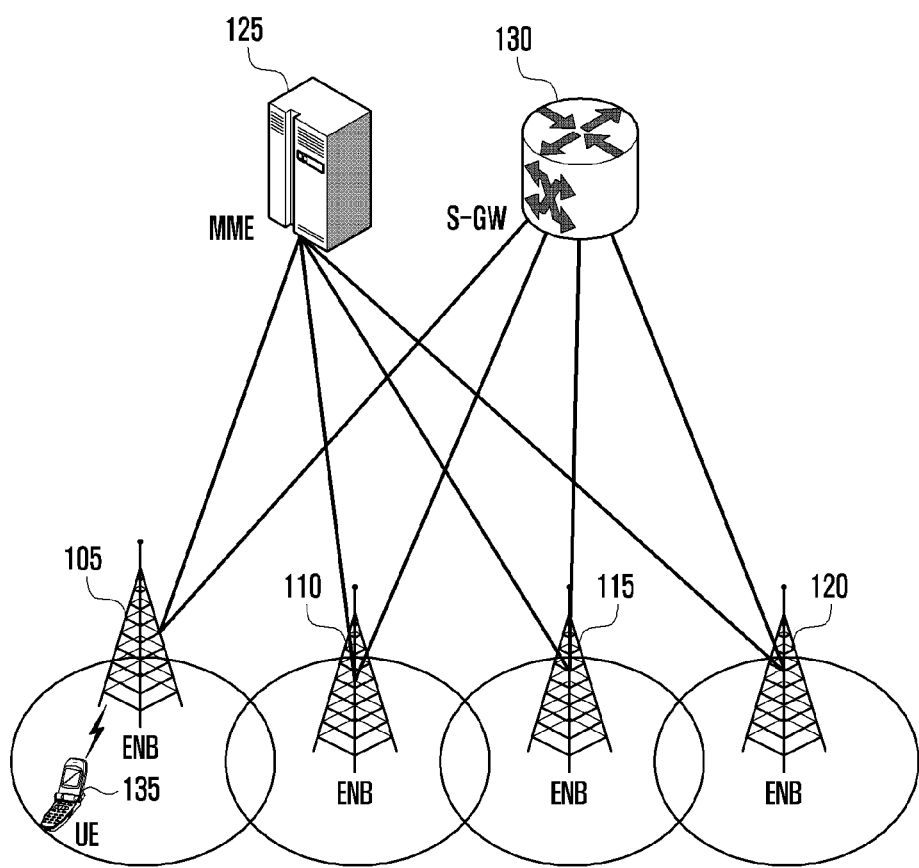
FIG. 1 is a diagram showing the configuration of an LTE system to which the disclosure is applied.

Hereinafter, embodiments of the disclosure are described in detail with reference to the accompanying drawings.

In describing the embodiments, a description of contents that are well known in the art to which the disclosure pertains and not directly related to the disclosure is omitted in order to make the gist of the disclosure clearer.

For the same reason, in the accompanying drawings, some elements are enlarged, omitted, or depicted schematically. Furthermore, the size of each element does not accurately reflect its real size. In the drawings, the same or similar elements are assigned the same reference numerals.

In this specification, in describing the embodiments, a description of contents that are well known in the art to which the disclosure pertains and not directly related to the disclosure is omitted in order to make the gist of the disclosure clearer.

For the same reason, in the accompanying drawings, some elements are enlarged, omitted, or depicted schematically. Furthermore, the size of each element does not accurately reflect its real size. In the drawings, the same or similar elements are assigned the same reference numerals.

The merits and characteristics of the disclosure and a method for achieving the merits and characteristics will become more apparent from the embodiments described in detail in conjunction with the accompanying drawings. However, the disclosure is not limited to the disclosed embodiments, but may be implemented in various different ways. The embodiments are provided to only complete the disclosure of the disclosure and to allow those skilled in the art to understand the category of the disclosure. The disclosure is defined by the category of the claims. The same reference numerals will be used to refer to the same or similar elements throughout the drawings.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing apparatus, so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded on a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

In this case, the term "unit", as used in the present embodiment means software or a hardware component, such as a field programmable gate array (FPGA) or an application-specific integrated circuit (ASIC), and the "unit" performs specific tasks. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more CPUs within a device or a security multimedia card.

The disclosure relates to a method and device for effectively updating system information by a terminal to which a long DRX cycle has been applied in a mobile communication system.

In the following description, in describing the disclosure, a detailed description of a related known function or configuration will be omitted if it is deemed to make the gist of the disclosure unnecessarily vague. Embodiments of the disclosure are described in detail with reference to the accompanying drawings.

FIG. 1 is a diagram showing the configuration of an LTE system to which the disclosure is applied.

Referring to FIG. 1, as shown, a radio access network of the LTE system includes evolved Node Bs (hereinafter referred to as "ENBs" or "Node Bs" or "base stations") 105, 110, 115 and 120, a mobile management entity (MME) 125 and a serving-gateway (may be hereinafter referred to as an "S-GW") 130. A user equipment (may be hereinafter referred to a "UE" or a "terminal") 135 may access an external network through the ENB 105~120 and the S-GW 130.

In FIG. 1, the ENBs 105~120 may correspond to the NodeBs of the existing universal mobile telecommunication system (UMTS). The ENB is connected to the UE 135 through a radio channel and may perform a function more complex than that of the existing Node B. In the LTE system, all of types of user traffic including a real-time service, such as voice over IP (VoIP) through the Internet protocol, are served through a shared channel. Accordingly, a device that performs schedules by collecting state information, such as the buffer state, available transmission power state, and channel state of UEs, is necessary. The ENBs 105~120 may be in charge of such a device. In general, one ENB controls multiple cells.

For example, in order to implement the transfer rate of 100 Mbps, the LTE system uses orthogonal frequency division multiplexing (hereinafter referred to as "OFDM") as a radio access technology in a 20 MHz bandwidth, for example. Furthermore, the LTE system may adopt an adaptive modulation & coding (hereinafter referred to as "AMC") scheme for determining a modulation scheme and a channel coding rate based on the channel state of a UE.

The S-GW 130 is an apparatus for providing a data bearer, and may generate or remove a data bearer under the control of the MME 125.

The MME 145 is an apparatus responsible for various control functions in addition to a mobility management function for a UE, and may be connected to multiple ENBs.

Figure 2A:
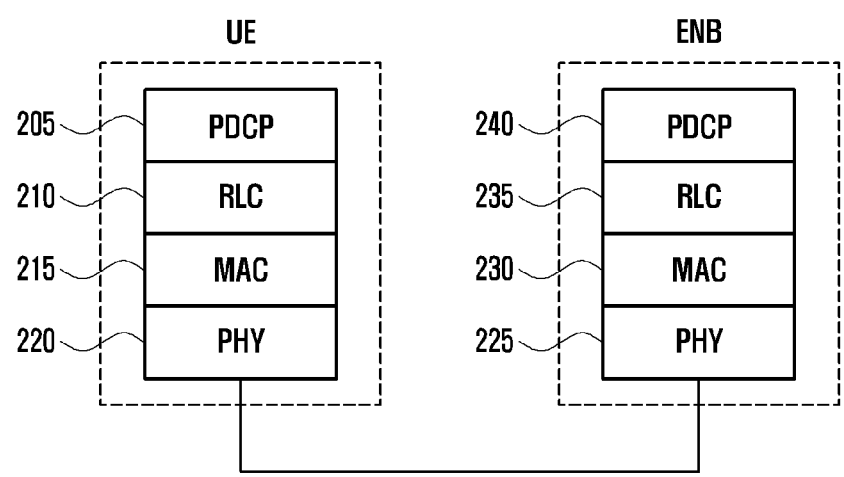
FIG. 2A is a diagram showing radio protocol architecture in the existing LTE system.

FIG. 2A is a diagram showing radio protocol architecture in the existing LTE system.

Referring to FIG. 2A, the radio protocol of the LTE system may include packet data convergence protocol layers (hereinafter referred to as PDCPs 205 and 240, radio link control (hereinafter referred to as RLCs 210 and 235, medium access control (hereinafter referred to as MACs 215 and 230, and physical layers (PHYs) 220 and 225 in a UE and an ENB, respectively.

The PDCP 205, 240 may be responsible for an operation, such as IP header compression/decompression. Major functions of the PDCP are as follows.

Header compression and decompression: ROHC only;
Transfer of user data;
n-sequence delivery of upper layer PDUs at PDCP re-establishment procedure for RLC AM;
For split bearers in DC (only support for RLC AM): PDCP PDU routing for transmission and PDCP PDU reordering for reception;
Duplicate detection of lower layer SDUs at PDCP re-establishment procedure for RLC AM;
Retransmission of PDCP SDUs at handover and, for split bearers in DC, of PDCP PDUs at PDCP data-recovery procedure, for RLC AM;
Ciphering and deciphering;
Timer-based SDU discard in uplink.

The radio link control 210, 235 may perform an automatic repeat request (may be hereinafter referred to as an ARQ) operation by reconfiguring a PDCP packet data unit (PDU) received from the PDCP layer in a proper side. Major functions of the RLC are as follows.

Transfer of upper layer PDUs;
Error Correction through ARQ (only for AM data transfer);
Concatenation, segmentation and reassembly of RLC SDUs (only for UM and AM data transfer);
Re-segmentation of RLC data PDUs (only for AM data transfer);
Reordering of RLC data PDUs (only for UM and AM data transfer);
Duplicate detection (only for UM and AM data transfer);
Protocol error detection (only for AM data transfer);
RLC SDU discard (only for UM and AM data transfer);
RLC re-establishment.

The MAC 215, 230 may be connected to several RLC layer devices configured in one UE, and may perform an operation of multiplexing RLC PDUs, received from the RLC layer, into a MAC PDU and demultiplexing RLC PDUs from a MAC PDU. Major functions of the MAC are as follows.

Mapping between logical channels and transport channels;
Multiplexing/demultiplexing of MAC SDUs belonging to one or different logical channels into/from transport blocks (TB) delivered to/from the physical layer on transport channels;
Scheduling information reporting;
Error correction through HARQ;
Priority handling between logical channels of one UE;
Priority handling between UEs by means of dynamic scheduling;
MBMS service identification;
Transport format selection;
Padding.

The physical layer 220, 225 may perform an operation of channel-coding and modulating higher layer data, producing an OFDM symbol and transmitting it to a radio channel or demodulating an OFDM symbol received through a radio channel, channel-decoding the demodulated symbol, and delivering it to a higher layer.

In Rel-13 LTE, in order to reduce power consumption of a UE, a technology for extending the existing DRX cycle has been introduced. This may be referred to as an extended DRX (eDRX).

In the disclosure, DRX operating in the existing DRX cycle (may be hereinafter referred to as a first cycle or a first DRX cycle) may be referred to as first DRX, and DRX operating in an extended cycle (may be referred to as a second cycle or a second DRX cycle) may be referred to eDRX or second DRX. Accordingly, in the disclosure, the first DRX may be defined as DRX operating in the first cycle, the second DRX may be defined as DRX operating in the second cycle, and the second cycle may include a cycle longer than the first cycle.

In the LTE system, the first DRX operation of UEs in the standby state may be performed through Equation 1 below. A system frame number (SFN) may increase by 1 every radio frame. When a paging signal is transmitted in a radio frame satisfying the corresponding equation, a UE may perform a reception operation by the first DRX. Hereinafter, a radio frame in which a paging signal is transmitted may be referred to as a paging frame (PF). Furthermore, a subframe in which a paging signal is transmitted within a paging frame may be referred to as a paging occasion (PO).

$$\text{SFN mod } T = (T \text{ div } N)*(\text{UE\_ID mod } N) \quad \text{Equation 1}$$

wherein,

SFN: a system frame number, and it may have 10 bits. (MSB 8 bits explicit, LBS 2 bits implicit)

T: First DRX cycle information of a UE (DRX cycle of the UE). It may be transmitted on a system information block (may be hereinafter interchangeably used with an SIB) 2 (transmitted on an SIB2). ENUMERATED {rf32, rf64, rf128, rf256}

N: min(T,nB)

Paging-related first parameter (nB): it may be transmitted on an SIB2. ENUMERATED {4T, 2T, T, T/2, T/4, T/8, T/16, T/32}.

UE_ID: IMSI mod 1024 (IMSI may mean a unique number assigned to each UE)

Specifically, the SFN may be transmitted to a UE through a master information block (MIB). 8 bits of an MIB transmitted through a physical broadcast channel (PBCH) may indicate an SFN.

The first DRX cycle information (T) and the paging-related first parameter (nB) may be provided through an SIB. For example, the first DRX cycle information (T) and the paging-related first parameter (nB) may be included in SystemInformationBlockType2 (SIB2) and provided from a base station. The first DRX cycle information (T) may have one value of {rf32, rf64, rf128, rf256}. r32 may indicate a 32-radio frame length. That is, r32 may mean 320 ms. Furthermore, the paging-related first parameter (nB) may indicate a paging number or a paging frequency. In the disclosure, the first DRX cycle information (T) and the paging-related first parameter (nB) provided through an SIB may be referred to as first DRX configuration information or a first DRX parameter.

Figure 2B:
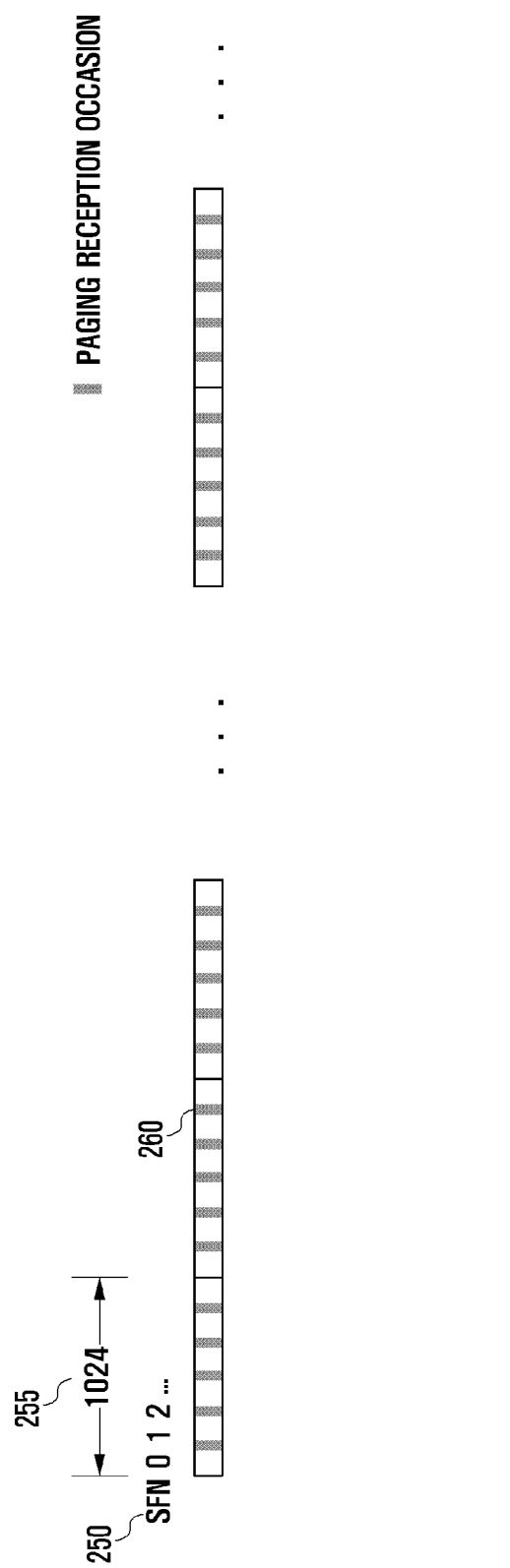
FIG. 2B is a diagram showing a paging occasion in first DRX.

FIG. 2B is a diagram showing a paging occasion in first DRX.

Referring to FIG. 2B, a system frame number (SFN) may increase by 1 every radio frame (250). Furthermore, the value of the system frame number (SFN) may be reset to 0 in 1024 cycles (255).

Referring to Equation 1, paging of the same pattern may be repeated every SFN cycle (260). Furthermore, from Equation 1, it may be seen that a maximum cycle of the first DRX is 2.56 seconds and although the first DRX cycle is increased to a maximum extent, it cannot exceed the cycle of an SFN, that is, 10.24 seconds. In other words, in order to reduce power consumption, the SFN cycle needs to be increased in order to increase the first DRX cycle to 10.24 seconds or more.

Accordingly, in order to increase the SFN cycle, additional SFN bits may be included in the existing or new SIB, and a UE operation of receiving them may be defined. The SFN bits may be increased by 1 every SFN cycle. A value indicated by the additional SFN bits may be referred to as a hyper system frame number (hyper SFN: HFN).

An SIB including the additional SFN bits does not need to be received by all UEs, and only a UE to which a very long DRX cycle has been applied may attempt to receive the SIB. Furthermore, a system information change indicator (systemInfoModification IE), included in system information change-related information (systemInfoValueTag value (one information (IE) included in an SIB1) and paging increased by 1 whenever SIB information is changed and to notify whether system information (SI) has been changed, is not influenced by a change in the SFN bits value. That is, although the SFN bits value is changed, the system information change-related information (systemInfoValueTag IE) is not updated, and the system information change indicator (systemInfoModification IE) is not transmitted through paging.

Figure 2C:
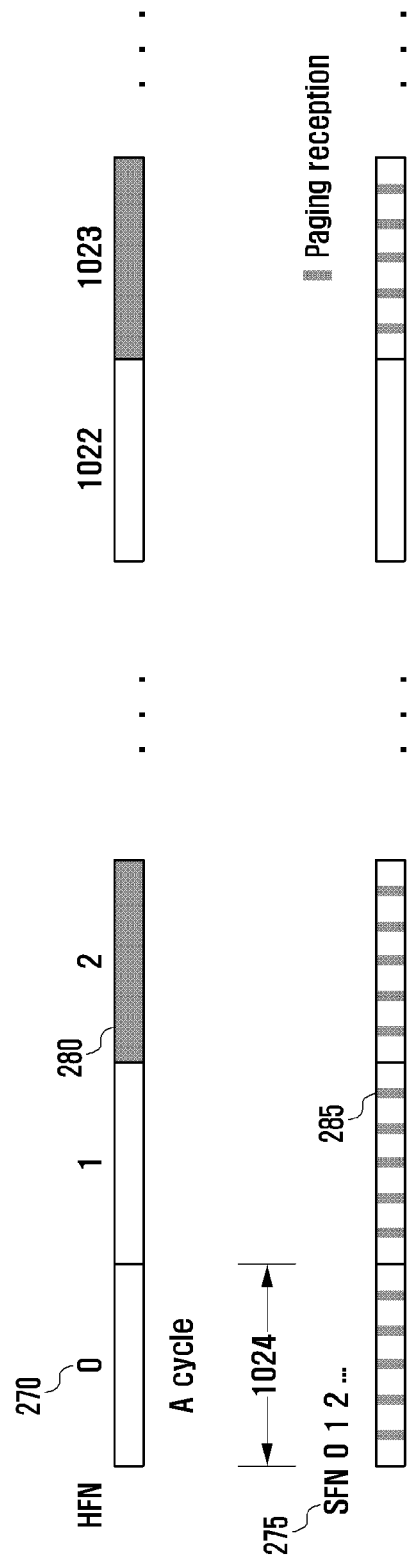
FIG. 2C is a diagram showing a paging occasion in second DRX.

FIG. 2C is a diagram for showing a paging occasion in second DRX.

As described above, an HFN may be increase by 1 every SFN cycle. That is, an HFN 270 may include 1024 SFNs 375. Furthermore, the SFN may increase by 1 every radio frame (375). A base station may generate paging according to Equation 1 in an SFN cycle determined by Equation 2 to be described later (385).

Specifically, in the disclosure, in order to increase a DRX cycle and also increase the reception success probability of a paging signal, a method of receiving a paging signal several times during a determined DRX period is assumed. To this end, a paging occasion may be determined through a two-step process.

1) First step: determine an SFN cycle (or HFN) in which paging will occur

2) Second step: determine a radio frame in which paging will occur in the SFN cycle (or HFN) determined in the first step In the first step, an SFN cycle in which paging will occur may be determined. Added SFN bits may have a value increased by 1 every SFN cycle. A value indicated by SFN bits (SFB bits) added as described above may be defined as a hyper system frame number (HFN).

A UE may identify an SFN cycle in which paging will occur using Equation 2. In the disclosure, an SFN cycle (or HFN) in which paging will occur may be referred to as a paging hyper frame (PHF).

$$\text{HFN mod } T' = (T'\text{div } N')*(UE\_ID \text{ mod } N') \quad \text{Equation 2}$$

wherein

N': min(T', nB')

UE_ID: IMSI mod 1024 (or MTC device group ID mod 1024)

The second DRX cycle information (T') and the paging-related second parameter (nB') value may be provided by a base station through an SIB. The second DRX cycle information (T') and the paging-related second parameter (nB') may be included in an SIB2 like the first DRX cycle information (T) and the paging-related first parameter (nB) or may be included in an SIB and transmitted.

In the disclosure, the second DRX cycle information (T') and the paging-related second parameter (nB') provided through an SIB may be referred to as second DRX configuration information or a second DRX parameter.

A UE ID (UE_ID) may be derived by the same IMSI module operation as that of a common UE. In the case of a machine type communication device, a group ID may also be applied because a device may be indicated in a group ID form. A UE may determine a PHF, that is, an SFN cycle in which paging will occur, and may determine whether paging will occur in which radio frames in the corresponding SFN cycle. The UE may identify a radio frame in which paging will occur in the corresponding SFN cycle using Equation 1.

If a paging generation occasion is defined in two steps as described above and communication devices have a DRX cycle, power consumption can be greatly reduced. Furthermore, there is an advantage in that the paging reception probability can be increased because paging may repeatedly occur based on the first DRX cycle information (T), paging-related first parameter (nB) configuration in the SFN cycle determined in the first step.

Specifically, a UE operating in the second DRX may perform a DRX operation in a first cycle during a given period when a second cycle is received. In this case, the given period may be referred to as a paging time window (PTW). The reception probability of paging can be increased because the paging can be repeatedly received during a given period as described above.

Figure 3:
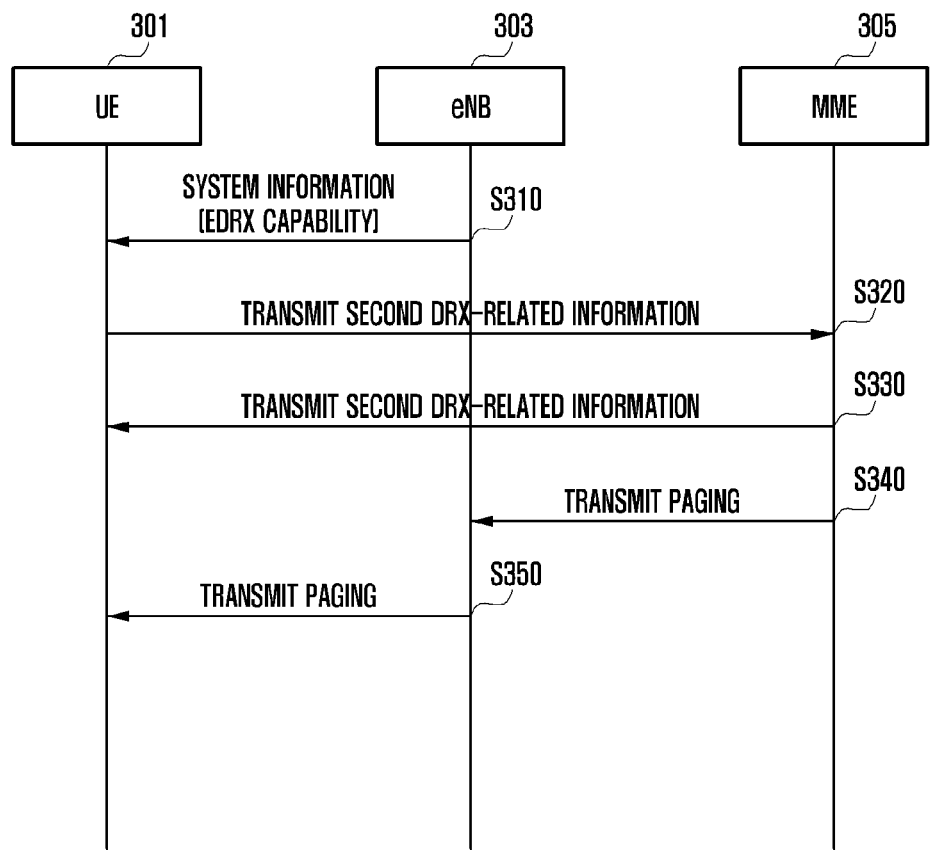
FIG. 3 is a diagram for illustrating a process for a second DRX operation.

FIG. 3 is a diagram for illustrating a process for a second DRX operation.

Referring to FIG. 3, an eNB 303 may transmit system information to a UE 301 at operation S310. The eNB 303 may notify the UE whether it supports second DRX (eDRX) using the system information. If the eNB 303 supports the second DRX, it may transmit system information, including second DRX capability (eDRX capability) information, to the UE. In this case, the second DRX capability information may include information indicating whether the second DRX is supported. Furthermore, the eNB may notify the UE whether it supports the second DRX using system information 1 (SIB1).

The UE that has received the system information may identify whether the eNB supports the second DRX based on the system information.

Furthermore, at operation S320, the UE may transmit second DRX (eDRX)-related information to an MME 305 through the eNB. For example, the second DRX-related information may include second DRX cycle information. If it is determined that the application of the second DRX is necessary, the UE may transmit a request message (e.g., ATTACH request message or TAU request message), including the second DRX-related information, to the MME.

In this case, the second DRX-related information may include second DRX cycle information. That is, if it is determined that the application of the second DRX is necessary, the UE may transmit the request message, including desired second DRX cycle information, to the MME.

If the second DRX cycle information is permitted, the MME 305 that has received the second DRX-related information may transmit the second DRX-related information to the UE at operation S330. In this case, the MME may transmit an ATTACH response message or TAU response message, including the second DRX-related information, to the UE.

In this case, the second DRX-related information may include second DRX cycle information. The MME may transmit the second DRX cycle information received from the UE or may transmit desired second DRX cycle information to the UE.

If second DRX cycle information is not included in the response message (ATTACH response message or TAU response message), the UE may not perform a second DRX operation. Furthermore, if the second DRX cycle information received from the MME is different from cycle information transmitted by the UE, the UE may perform a second DRX operation using the second DRX cycle information received from the MME.

Furthermore, the UE that has received the second DRX-related information from the MME may perform paging monitoring using the second DRX (eDRX) cycle.

Thereafter, when paging for the UE reaches the MME, the MME 305 may deliver paging, including the second DRX (eDRX)-related information (e.g., cycle information), to the eNB at operation S340.

Accordingly, the eNB may identify the second DRX-related information included in the paging message. Accordingly, the eNB may transmit paging to the UE by applying the second DRX (eDRX) cycle at operation S350.

In view of the second DRX (eDRX) driving process, the MME may be aware of whether a given UE drives second DRX (eDRX), and may have stored second DRX (eDRX) cycle information applied to the UE that drives the second DRX.

Figure 4:
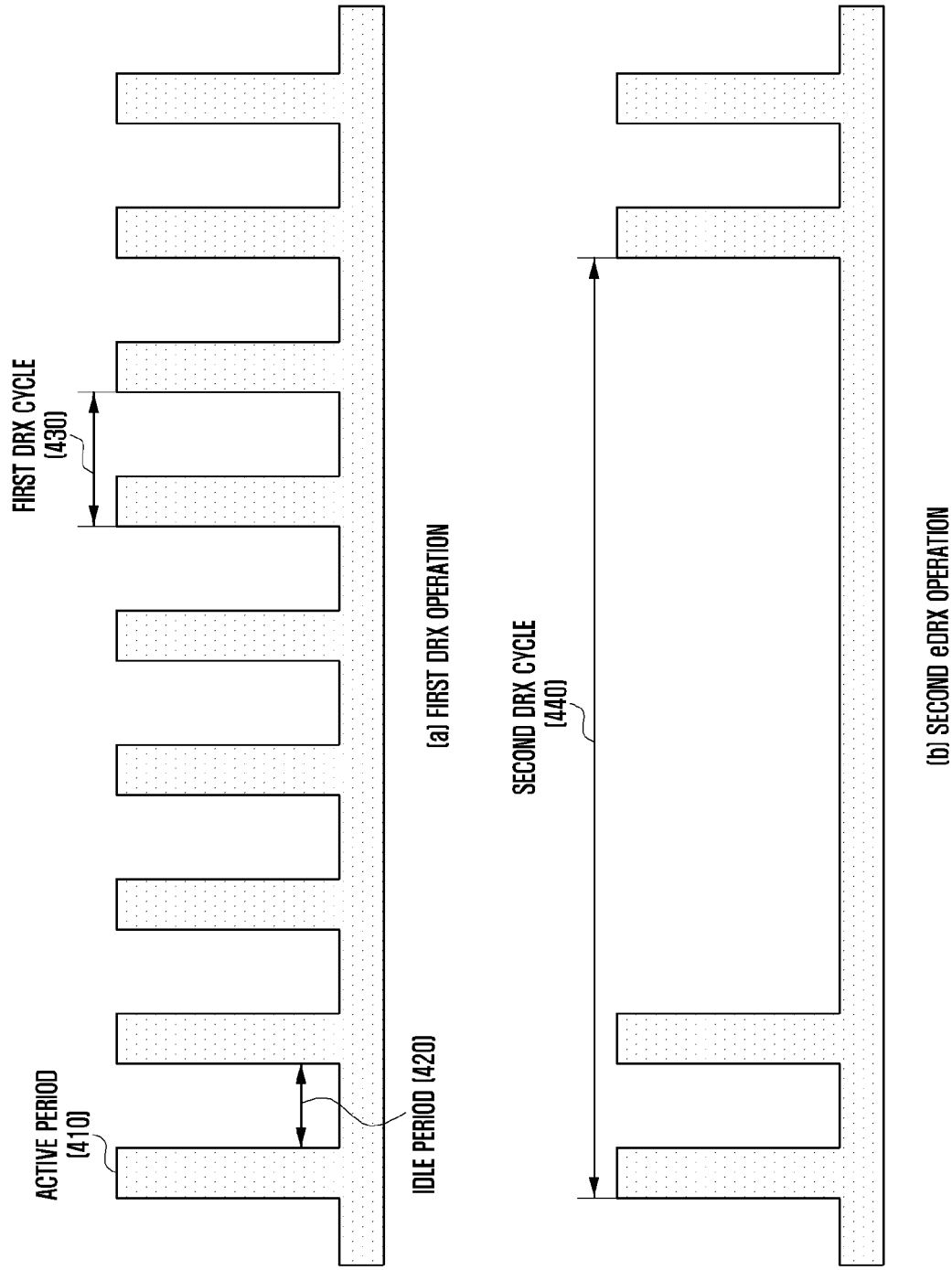
FIG. 4A is a diagram showing a first DRX operation according to the disclosure.
FIG. 4B is a diagram showing a second DRX operation according to the disclosure.

FIG. 4A is a diagram showing a first DRX operation according to the disclosure.

Referring to FIG. 4A, a UE needs to monitor paging delivered from a network in order to identify whether there is a cell intended therefor or a given service request. However, if the UE always perform the paging monitoring, power consumption is large. Accordingly, the UE may perform paging monitoring in each determined cycle agreed with the network. As described above, an operating of monitoring paging every determined cycle is called a DRX operation.

Specifically, a UE performing a DRX operation may wake up only during an active time 410 and receive paging or measure a cell. During other time (idle time, 420), the UE may turn off a communication modem or radio frequency (RF). In this case, a cycle in which the active time is repeated is called a first DRX cycle 430. A maximum first DRX cycle may be 2.56 seconds.

Meanwhile, the power saving effect attributable to a DRX operation may be increased as the DRX cycle is extended as described above. That is, the power saving effect may be increased as the time during which the communication modem or RF of a UE is off is increased. Accordingly, the DRX cycle needs to be further increased in order to maximize the power saving effect. Accordingly, second DRX (eDRX) having an extended DRX cycle has been introduced.

FIG. 4B is a diagram showing a second DRX operation according to the disclosure.

Referring to FIG. 4B, a second DRX cycle 440 may be configured to be longer than the first DRX cycle 430. For example, in Rel-13 3G/LTE standard, a maximum second DRX cycle value has extended to 43.69 minutes in the standby mode and to 10.24 seconds in the connected mode.

When a power saving mode is driven, a UE may drive the above-described second DRX (eDRX) technology. However, if the second DRX (eDRX) cycle is configured to be extremely long, the power saving effect is maximized, but a user must wait for a long time in order to receive paging at a proper time.

Figure 5:
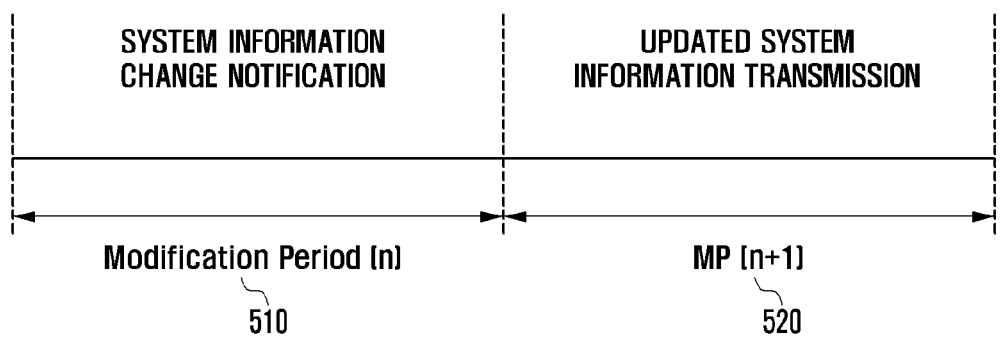
FIG. 5 is a diagram showing a process of changing system information.

FIG. 5 is a diagram showing a process of changing system information.

System information broadcasted by a base station may be changed based on a modification period. The base station may broadcast newly changed system information from an occasion when each modification period starts other than some system information. Furthermore, the base station may notify UEs that changed system information will be broadcasted from a next modification period in a previous modification period before the newly changed system information is broadcasted.

For example, when changed system information is broadcasted from an (n+1)-th modification period 520, a base station may notify UEs that system information is changed from a next modification period in an n-th modification period 510 right before the (n+1)-th modification period.

To this end, the base station may notify the UEs whether system information has been changed using a paging message. The UE needs to receive at least one paging within the modification period in order to identify whether system information has been changed. If a system information change indicator (systemInfoModification IE) is included in the paging message, this may mean that newly updated system information is transmitted from a next period of the modification period in which the paging is transmitted. For example, the system information change indicator (systemInfoModification IE) may have 1 bit to indicate whether to update system information.

Furthermore, if system information other than some system information is changed, the base station may increase system information change-related information (may be interchangeably used with a term, such as systemInfoValueTag or valuetag, hereinafter), included in an SIB1, by 1. The system information change-related information (systemInfoValueTag) may be used for a UE that has camped on again from out-of-coverage to determine whether system information stored in the UE will be identical with now broadcasted system information. The UE may determine whether system information has been changed using the paging message or the system information change-related information (systemInfoValueTag) of the SIB1.

If a DRX cycle is extended to be longer than a maximum value of a modification period in order to reduce consumption power, that is, if second DRX is applied, however, a UE may not receive paging within a modification period. In this case, the UE cannot identify whether system information is newly updated. In particular, if configuration information on a paging message among system information is changed, a problem in that the UE does not subsequently receive a paging message in a modification period may occur. Accordingly, there is a need for a method for solving this problem.

Figure 6:
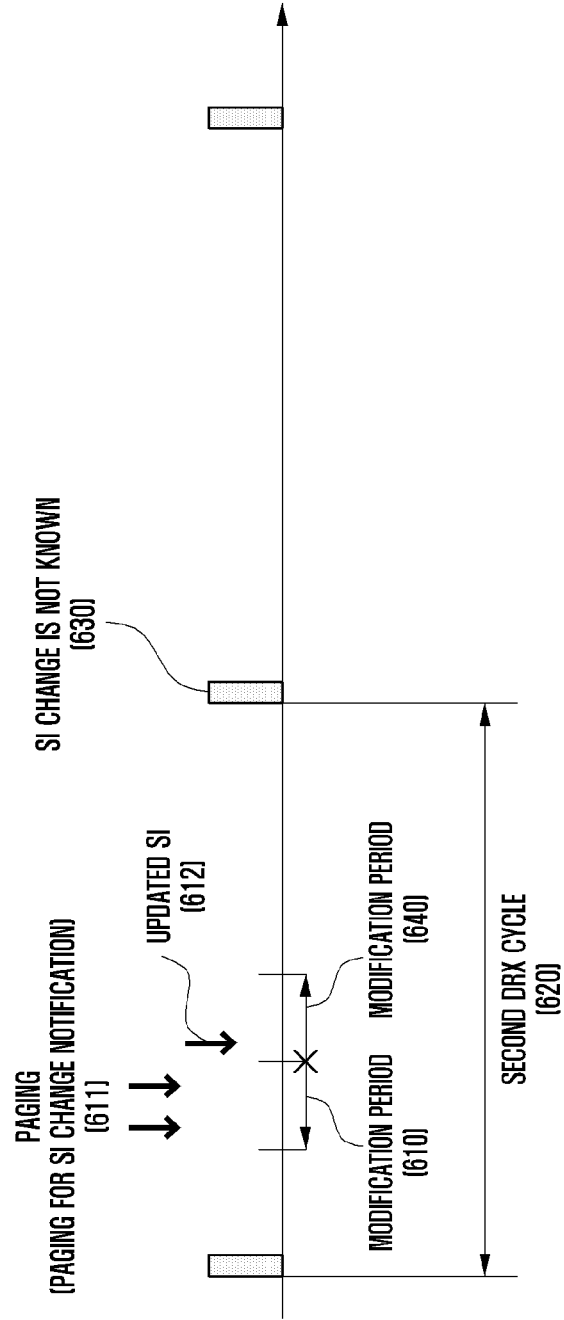
FIG. 6 is a diagram showing a process of changing system information (SI) when a second DRX cycle is applied.

FIG. 6 is a diagram showing a process of changing system information (SI) when a second DRX cycle is applied.

Referring to FIG. 6, a base station may notify a UE that system information (SI) will be changed using paging 611 prior to a system information (SI) change or update (612). As described above, such an operation may be performed based on a modification period 610.

Specifically, when the base station transmits the updated system information (updated SI) 612 in a modification period 640, it may notify the UE that system information (SI) will be changed in the next modification period 640 during the modification period 610 prior to a system information (SI) change. Accordingly, the UE needs to identify whether system information (SI) is changed in the next modification period 640 by receiving at least one paging during the modification period 610.

However, a UE operating in DRX checks paging every DRX cycle. Accordingly, if the UE operates in second DRX, it cannot receive paging if the paging is transmitted in a second DRX cycle 620, and cannot identify whether to update the system information (630).

Accordingly, after the second DRX cycle elapses, the UE has to identify whether system information has been changed by receiving paging in the modification period. If system information related to a paging message is changed, however, a problem in that the UE cannot receive a paging message may occur.

In order to solve the problem, the disclosure describes a method of extending a modification period and a method for a UE to wake up right before DRX timing and to identify cell selection or cell (re)selection and whether system information (SI) has been changed, and proposes a method of selectively applying the method according to a given condition.

Figure 7:
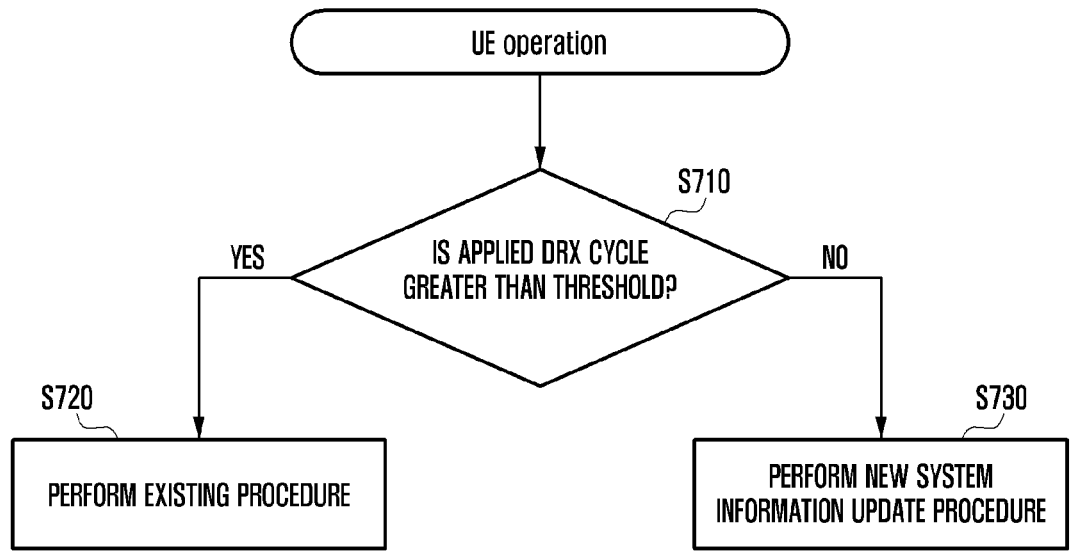
FIG. 7 is a diagram showing a process of updating system information in a DRX cycle.

FIG. 7 is a diagram showing a process of updating system information in a DRX cycle.

Referring to FIG. 7, a UE may selectively apply the existing system information update procedure or a new system information update procedure based on a DRX cycle. In this case, the new system information (SI) update method may mean a method for a UE to wake up right before extended DRX timing and to identify cell selection or cell (re)selection and whether system information (SI) has been changed in addition to a method of providing notification of whether to update the system information (SI) using the existing paging.

At operation S710, the UE may determine whether a currently applied DRX cycle is greater than a threshold X. The threshold X may be pre-determined value or may be received from a base station explicitly. For example, a modification period may be extended to a maximum of 10.24 seconds. Accordingly, the base station may set 10.24 seconds as the threshold X. That is, the base station may set the threshold based on the length of the modification period. Alternatively, the length of the modification period may be determined to be the threshold. In this case, the base station may notify the UE of the threshold X through a system information block (SIB) or dedicated signalling.

If, as a result of the determination, the currently applied DRX cycle is smaller than the threshold X, the UE performs the existing system information (SI) update procedure at operation S720. That is, the UE may attempt paging reception at DRX timing.

If a system information change indicator (systemInfoModification IE) included in the received paging has a "true" value or is set as true, this provides notification that system information (SI) will be changed in a next modification period. The UE may receive new system information (SI) in the next modification period using a modification period value received from system information (e.g., SIB2).

Meanwhile, if the currently applied DRX cycle is greater than the threshold X, the UE may perform a new system information update procedure.

That is, the UE may wake up right before DRX timing and may identify a cell to be selected or (re)selected (suitable cell) by performing a cell selection or (re)selection operation. Specifically, the UE may wake up right before DRX timing in an inactive period and perform a cell selection or (re)selection operation. In this case, the suitable cell to be selected or (re)selected may mean a cell on which the UE camps in order to obtain common service or may mean a cell included in a selected PLMN or a registered PLMN. Alternatively, the suitable cell may mean a cell that the UE has joined or a cell to which the UE's access is not prohibited. Accordingly, the UE may perform a system information (SI) validity check by receiving system information (e.g., SIB1) from an identified cell. The UE may perform the SI validity check using system information change-related information (value tag), which is described in detail later.

If, as a result of the SI validity check, an SI update is necessary, the UE may receive updated system information (SI). However, if RRC connection establishment is not necessary (e.g., if its own paging record is not present after paging is received), the UE may not receive system information (SI).

Furthermore, a base station may notify a UE whether to update system information (SI) using paging as in the existing system information (SI) update method. However, in order to notify the UE whether to update the system information (SI) through paging a new modification period is necessary because the UE applying a second DRX (eDRX) cycle has to receive at least one paging in a modification period.

Figure 8:
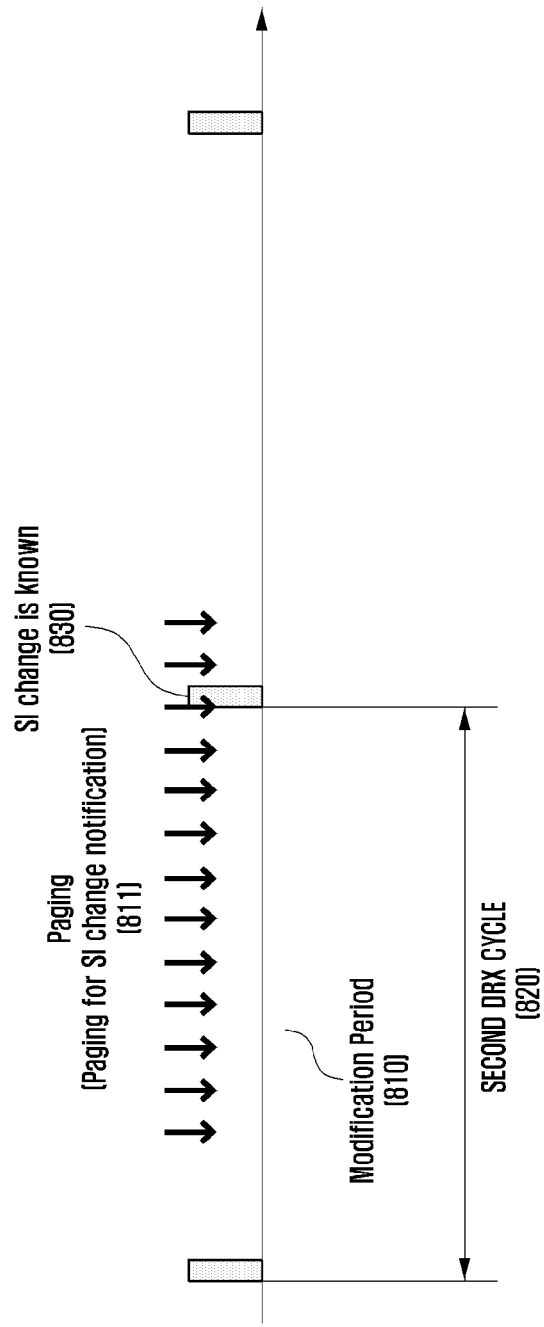
FIG. 8 is a diagram showing a method of extending a modification period.

FIG. 8 is a diagram showing a method of extending a modification period.

Referring to FIG. 8, paging may be received although a very long DRX cycle (second DRX cycle) is applied.

Specifically, referring to FIG. 8, a modification period may be extended so that at least one piece of DRX timing is included in one modification period 810. That is, the modification period 810 may be configured to be longer than a second DRX cycle 820. In this case, paging 811 providing notification of a system information (SI) change may be transmitted during the extended modification period. A UE may receive the paging at least once (830).

The modification period value may be provided to the UE through system information (e.g., SIB2).

However, signaling overhead in transmitting paging during a modification period may also increase because the modification period has to be extended as a DRX cycle becomes longer.

In summary, for a UE to which second DRX (eDRX) is applied, a base station and the UE may use two system information (SI) update methods as a new system information update procedure.

Method 1

The UE may wake up right before DRX timing, may identify a cell to be selected or (re)selected (suitable cell) by performing a cell selection or (re)selection operation, and may receive system information (SI) from the cell.

Accordingly, the UE may perform a validity check using system information change-related information included in the system information, and may receive updated system information if the update of system information is necessary.

However, if RRC connection establishment is not necessary (e.g., if its own paging record is not present after paging is received), the UE may not receive system information (SI).

Method 2

The base station may indicate that a system information (SI) update is necessary through paging in an extended modification period, and may update system information (SI) in a next modification period.

In this case, the extended modification period is applied separately from the existing modification period. In the disclosure, the existing modification period may be referred to as a first modification period, and the extended modification period may be referred to as a second modification period.

The disclosure proposes a base station operation of selectively using the two methods based on updated system information. Furthermore, the disclosure proposes a UE operation of selectively updating system information according to circumstances.

Figure 9:
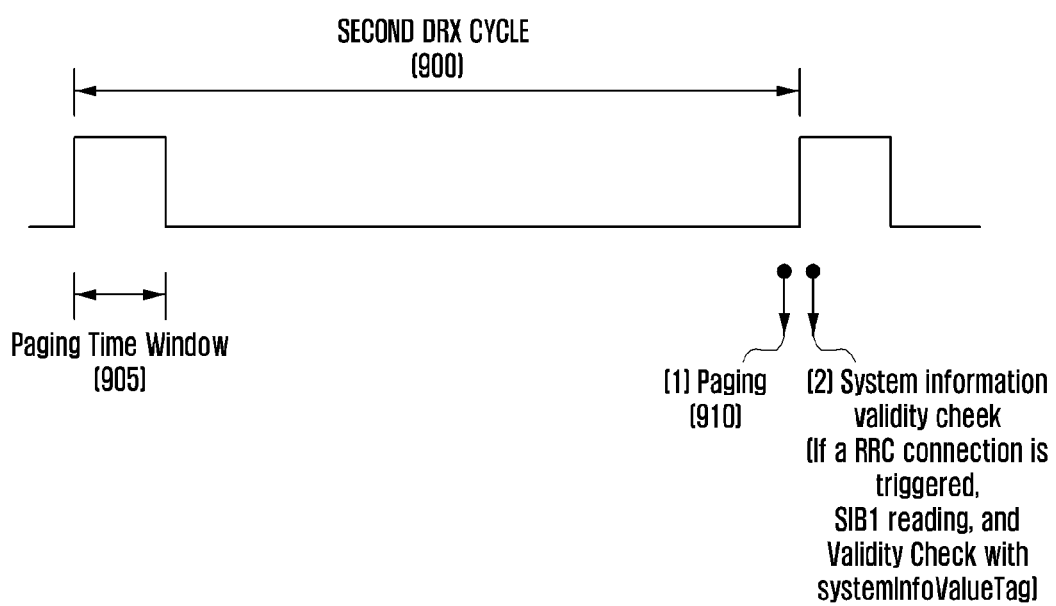
FIG. 9 is a diagram showing a method of identifying the update of system information.

FIG. 9 is a diagram showing a method of identifying the update of system information.

A method of identifying the update of system information through a validity check prior to RRC connection establishment is described with reference to FIG. 9.

A UE may perform the method when a second DRX (eDRX) cycle is longer than a modification period.

The UE may receive paging during a configured paging time window (PTW) 905 in each second DRX (eDRX) cycle 900. Specifically, a UE operating in the second DRX may perform a DRX operation according to a first cycle during a given period when a second cycle is reached. In this case, the given period may be called a PTW. As described above, the reception probability of paging can be increased because the paging is repeatedly received during a given period.

After the UE receives the paging 910 during the PTW period, if its own paging record is included in a paging message, the UE may receive system information (e.g., SIB1) broadcasted from the cell.

Furthermore, the UE may identify system information change-related information (value of a value tag) included in the system information, and may determine whether the identified system information change-related information is identical with previously stored system information change information (value tag value) (915). Such an operation may be referred to as an SI validity check (or validity check).

If the previously stored system information change information (value tag value) and the system information change-related information (value of a value tag) included in the system information are different, the UE may receive system information broadcasted from the cell before it performs RRC connection establishment.

Meanwhile, if the UE's paging record is not present in the received paging message, the UE may read the system information (e.g., SIB1) and may not perform an SI validity check.

If such a method is used, a UE may need to successfully decode a received paging message, but may not properly operate if paging configuration information provided as system information is changed.

Figure 10:
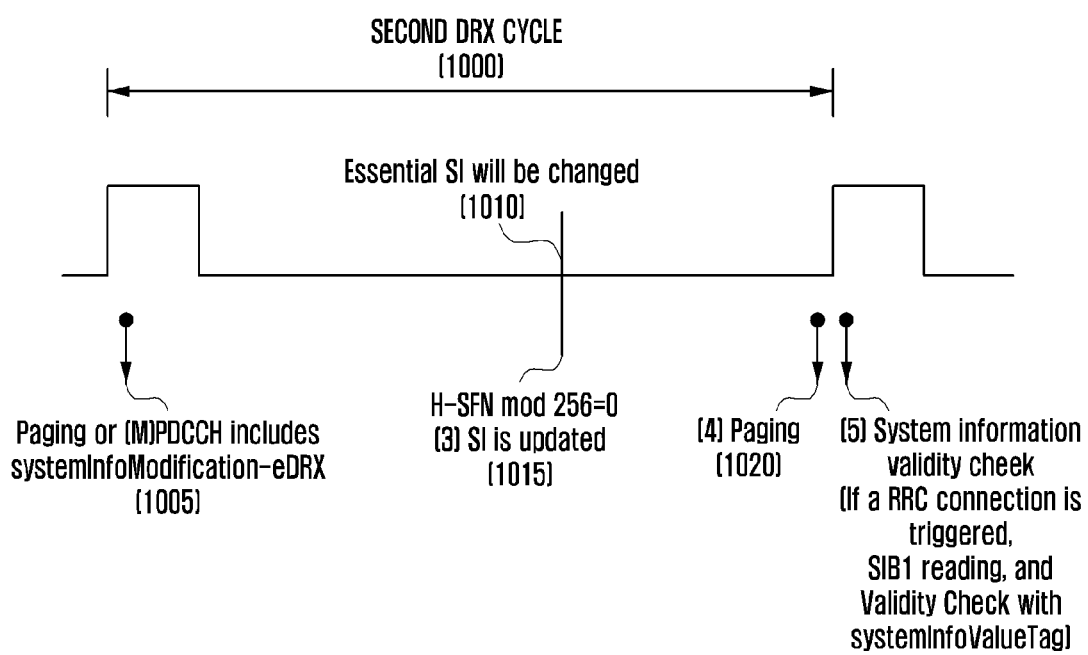
FIG. 10 is a diagram showing another method of identifying the update of system information.

FIG. 10 is a diagram showing another method of identifying the update of system information.

FIG. 10 is a diagram for illustrating a method of indicating whether the update of system information (SI) is necessary by transmitting paging in an extended modification period.

When a second DRX (eDRX) cycle is longer than the length of a modification period, a UE may identify whether to update system information according to the method.

The UE may receive paging during a configured PTW (1005) time period in each second DRX (eDRX) cycle 1000. When a second DRX cycle is reached, a UE operating in second DRX may perform a DRX operation according to a first cycle during a PTW period. The reception probability of paging can be increased by repeatedly the paging during a PTW period.

If a second DRX-related system information change indicator (systemInfoModification-eDRX indicator) is included in the paging message, system information (SI) may be updated from a given occasion (1010). The indicator may indicate that the updated system information (SI) is transmitted from the given occasion.

In the disclosure, a system information change indicator (systemInfoModification-eDRX) for second DRX and a system information change indicator (systemInfoModification-DRX) for first DRX may be separately managed. As will be described later, in the disclosure, system information necessary to receive a paging message may be defined as first system information. If a UE operates in second DRX and first system information is updated, the UE may be notified of the update of the first system information by including the system information change indicator (systemInfoModification-eDRX) for the second DRX in a paging message and transmitting the paging message. Detailed contents are described later. In the disclosure, the system information change indicator (systemInfoModification-DRX) for the first DRX may be referred to as a first system information change indicator, and the system information change indicator (systemInfoModification-eDRX) for the second DRX may be referred to as a second system information change indicator. However, in the disclosure, a system information change indicator may mean the second system information change indicator.

Alternatively, the system information change indicator (systemInfoModification-eDRX) for the second DRX and the system information change indicator (systemInfoModification-DRX) for the first DRX may be managed as one.

The given occasion may mean an occasion when H-SFN mod 256=0 (1015) is satisfied. The UE may identify that the occasion is present at given intervals, that is, 256*10.24 seconds, through a received paging message. This may mean a second modification period (extended modification period).

Accordingly, the UE may receive a paging message at least once within the PTW period within the given interval. To this end, a base station needs to include the second system information change indicator (systemInfoModification-eDRX indicator) in each paging message transmitted during the second modification period (extended modification period).

After the second DRX cycle 1000 expires, if the UE's paging record is included in the paging message after paging 1020 is received during the PTW period, the UE may perform an SI validity check 1025. The method may have great signaling overhead because the base station has to transmit a paging message, including the second system information change indicator, during the second modification period (extended modification period).

Meanwhile, Method 1 has a problem in that a UE cannot receive a paging message if paging configuration information provided as system information is changed. Method 2 has a problem in that signaling overhead may occur. Accordingly, in order to overcome the above-described problems, the disclosure proposes a method for a base station to determine whether to use a method of indicating whether system information (SI) needs to be updated through paging depending on the type of updated system information. As described above, in the disclosure, system information necessary for a UE to receive a paging message may be defined as first system information.

If a paging message is used to indicate whether system information (SI) needs to be update, a paging message has to be transmitted for a long time. In order to reduce corresponding signaling overhead, most of the update of system information may use Method 1. That is, a UE may identify whether to update system information using system information change-related information when a RRC connection is triggered.

However, a UE needs to receive a paging message at least in order to determine whether to perform RRC connection establishment. Accordingly, a base station may notify a UE of first system information necessary to receive a paging message only when the first system information is updated through a paging message. In this disclosure, system information other than first system information may be defined as second system information. For example, representative first system information may include paging control channel configuration information (pcch-config IE), which may be included in a system information block (e.g., SIB2) and broadcasted.

The paging control channel configuration information (pcch-config IE) may include configuration information, such as that of Table 1.

TABLE 1

| PCCH-Config ::= | SEQUENCE { |
|---|---|
| defaultPagingCycle | ENUMERATED { |
| | rf32, rf64, rf128, rf256}, |
| nB | ENUMERATED { |
| | fourT, twoT, oneT, halfT, quarterT, oneEighthT, |
| | oneSixteenthT, oneThirtySecondT} |
| } | |

TABLE 1-continued

```
PCCH-Config-v1310 ::=           SEQUENCE {
    paging-narowBands-r13           INTERGER (1..maxAvailNarrowBands-r13),
    mpdcch-NumRepetition-Paging-r13  ENUMERATED {r1, r2, r4, r8, r16, r32, r64, r128,
r256},
    nB-v1310                        ENUMERATED {one64thT, one128thT, one256thT},
                                                                   OPTIONAL    --
Need OR
}
```

The default paging cycle (defaultPagingCycle) may indicate a cell-specific paging cycle. The paging-elated first parameter (nB) is a variable used to derive a paging frame (PF).

Furthermore, the machine type communication (MTC) technology has an object of expanding a coverage. A base station may repeatedly transmit a machine type physical downlink control channel (MPDCCH) indicative of paging and a paging message in a plurality of narrowbands. Related configuration information may be included in pcch-config.

A paging-narrowband may be used to indicate a narrowband used for paging. The range of a paging-related first parameter (nB value) may be extended by taking into consideration repetition transmission.

Accordingly, in the disclosure, if a related cell supports MTC, when information of a pcch-Config-v1310 IE is changed, a base station broadcasts that an SI update is necessary using a paging message.

In addition, in the disclosure, when subframe bitmap-related information (fdd-DownlinkOrTddSubframeBitmapLC-r13) and hopping-related information (si-HoppingConfigCommon-r13) included in an SIB1 are changed, a base station broadcasts that an SI update is necessary using a paging message.

fdd-DownlinkOrTddSubframeBitmapLC-r13 may include subframe information which may be used by a UE to which the MTC technology is applied. A paging message delivered to an MTC UE is information necessary for the UE to receive a paging message because the message is transmitted only in a subframe.

si-HoppingConfigCommon-r13 may indicate whether an SI message and a paging message are subjected to frequency hopping (frequency movement when a message is transmitted). If the information is not present, a UE may need to perform blind decoding on an available frequency. Accordingly, the information is information necessary for the UE to receive a paging message.

TABLE 2

```
bandwidthReducedAccessRelatedInfo-r13    SEQUENCE {
    si-WindowLength-BR-r13                   ENUMERATED {
                                                 ms20, ms40, ms60, ms80, ms120,
                                                 ms160, ms200, spare},
    si-RepetitionPattern-r13                 ENUMERATED {everyRF, every2ndRF, every4thRF,
                                                 every8thRF},
    schedulingInfoList-BR-r13                SchedulingInfoList-BR-r13    OPTIONAL, --
Need OR
    fdd-DownlinkOrTddSubframeBitmapLC-r13    CHOICE {
        subframePattern10-r13                    BIT STRING (SIZE (10)),
        subframePattern40-r13                    BIT STRING (SIZE (40)),
    }                                        OPTIONAL, --
Need OP
    fdd-UplinkSubframeBitmapLC-r13           BIT STRING (SIZE (10))       OPTIONAL, --
Need OP
    startSymbolLC-r13                        INTEGER (1..4),
    si-HoppingConfigCommon-r13               ENUMERATED (on, off),
    si-ValidityTime-r13                      ENUMERATED {true}   OPTIONAL,       --
Need OP,
    systemInfoValueTagList-r13               SystemInfoValueTagList-r13   OPTIONAL --
Need OR,
    }                                                            OPTIONAL,   -- Cond BW-
reduced
```

Figure 11A:
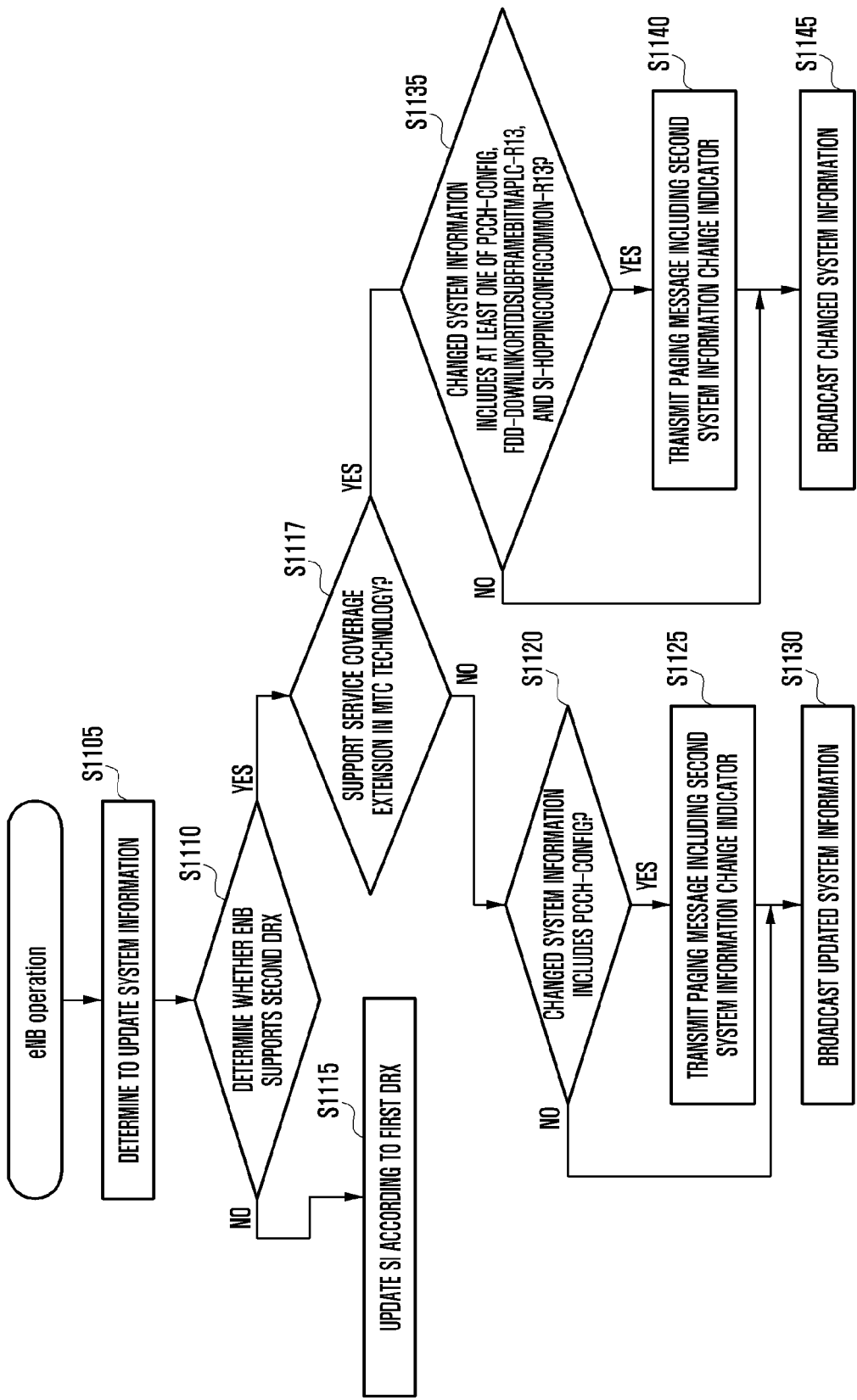
FIG. 11A is a diagram showing an operation of an eNB in the disclosure.

FIG. 11A is a diagram showing an operation of an eNB in the disclosure.

Referring to FIG. 11A, the eNB may determine to update system information at operation S1105. In this case, the eNB may determine to update some of or the entire system information. The eNB may determine to update first system information.

At operation S1110, the eNB may determine whether the eNB supports second DRX (extended DRX cycle).

If the eNB does not support the second DRX, the eNB may determine to update system information (SI) according to first DRX (the existing technology) at operation S1115.

Accordingly, a UE may attempt to receive paging at DRX timing. If a system information change indicator (systemInfoModification IE) included in the received paging has a "true" value or is set as true, this provides notification that system information (SI) will be changed in a next modification period. The UE may receive new system information (SI) in a next modification period using a modification period value obtained from system information (e.g., SIB2).

In contrast, if the eNB supports the second DRX, the eNB may determine whether it supports a coverage extension function in the MTC technology at operation S1117.

If the eNB does not support the coverage extension function in the MTC technology, the eNB may determine whether changed system information includes at least paging control channel configuration information (pcch-config) at operation S1120.

If the changed system information includes paging control channel configuration information, the eNB may transmit a paging message or PDCCH, including a second system information change indicator (or SI update indicator), to the UE in order to notify whether to update the system information (SI) through the paging message at operation S1125.

In contrast, if the changed system information does not include paging control channel configuration information, the eNB may omit operation S1125.

Thereafter, the eNB may broadcast updated system information in a next second DRX acquisition period (eDRX acquisition period) at operation S1130. In this case, the eNB may broadcast the updated system information at an occasion when H-SFN mod 256=0 is satisfied.

Meanwhile, if the eNB supports the coverage extension function in the MTC technology, the eNB may determine whether the changed system information includes at least one of paging channel configuration information (pcch-config), subframe bitmap-related information (fdd-DownlinkOrTddSubframeBitmapLC-r13), and hopping-related information (si-HoppingConfigCommon-r13) at operation S1135.

If at least one of the pieces of information is included in the changed system information, the eNB may transmit a paging message or (M)PDCCH, including a second system information change indicator (SI update indicator), to the UE in order to notify the UE whether to update the system information (SI) through the paging message at operation S1140.

However, if at least one of the pieces of information is not included in the changed system information, the eNB may omit operation S1140.

Thereafter, the eNB may broadcast the updated system information in a next second DRX acquisition period (eDRX acquisition period) at operation S1145. In this case, the eNB may broadcast the updated system information at an occasion when H-SFN mod 256=0 is satisfied.

The disclosure proposes a system information (SI) reception method when a UE receives a system information (SI) update indicator or after a given operation in order to minimize the complexity of the UE when system information (SI) is updated.

When a UE receives an SI update indicator, that is, a second system information change indicator (systemInfoModification-eDRX, through a paging message, the UE has to receive updated system information from a given occasion. As described above, the occasion is an occasion when H-SFN mod 256=0 is satisfied. In this case, the UE will update the entire system information because the UE is unaware that which system information is to be updated and may recognize that system information will be simply updated.

In the disclosure, however, when a UE in which second DRX (eDRX) has been configured receives an SI update indicator, that is, a second system information change indicator (systemInfoModification-eDRX), through a paging message, the UE updates only an SIB1 and an SIB2 form a given occasion. The reason for this is that configuration information necessary to receive the paging message is included in the SIB1 and the SIB2. The UE that has updated only the SIB1 and SIB2 does not increase the value of system information change-related information (systemInfoValueTag) by 1 because the entire system information is not updated. If the UE determines that RRC connection establishment is necessary through a paging message (when the paging message includes the paging record of the UE), the UE may determine whether to update the system information by comparing stored system information change-related information (systemInfoValueTag) with system information change-related information included in the SIB1.

When only the SIB1 and SIB2 are updated, the UE may update the entire system information if the system information change-related information included in the updated SIB1 is different from the stored system information change-related information because the value of the stored system information change-elated information (systemInfoValueTag) has not been increased by 1.

In contrast, if RRC connection establishment is not actually performed, the UE may update only the SIB1 and SIB2. Accordingly, UE complexity occurring because the entire system information is received can be reduced.

Furthermore, in the disclosure, if a UE in which second DRX (eDRX) has been configured performs a cell selection or (re)selection operation prior to the paging reception, the UE omits an SI validity check when RRC connection establishment is performed based on a paging message (when the paging message includes the paging record of the UE).

A UE in which second DRX (eDRX) has been configured may also move to a neighbor cell. Accordingly, the UE may change a serving cell through cell selection or (re)selection. When the serving cell is changed, an operation first performed by the UE is to read (receive) system information from the new serving cell. This is for identifying whether the changed serving cell is a suitable cell and TA has been changed. If necessary, a TAU may be necessary, and the UE may perform a TAU procedure.

After the new serving cell is discovered, the UE may receive a paging message from the cell. In this case, if RRC connection establishment is necessary based on the received paging message (when the paging message includes the paging record of the UE), the UE needs to perform an SI validity check according to a system information (SI) update method in second DRX (eDRX). However, in the disclosure, such an operation may be omitted. The reason for this is that the recent system information has already been received from the cell in the cell (re)selection process. According to the disclosure, a UE may avoid the redundant reception of system information occurring due to a standard operation.

Figure 11B:
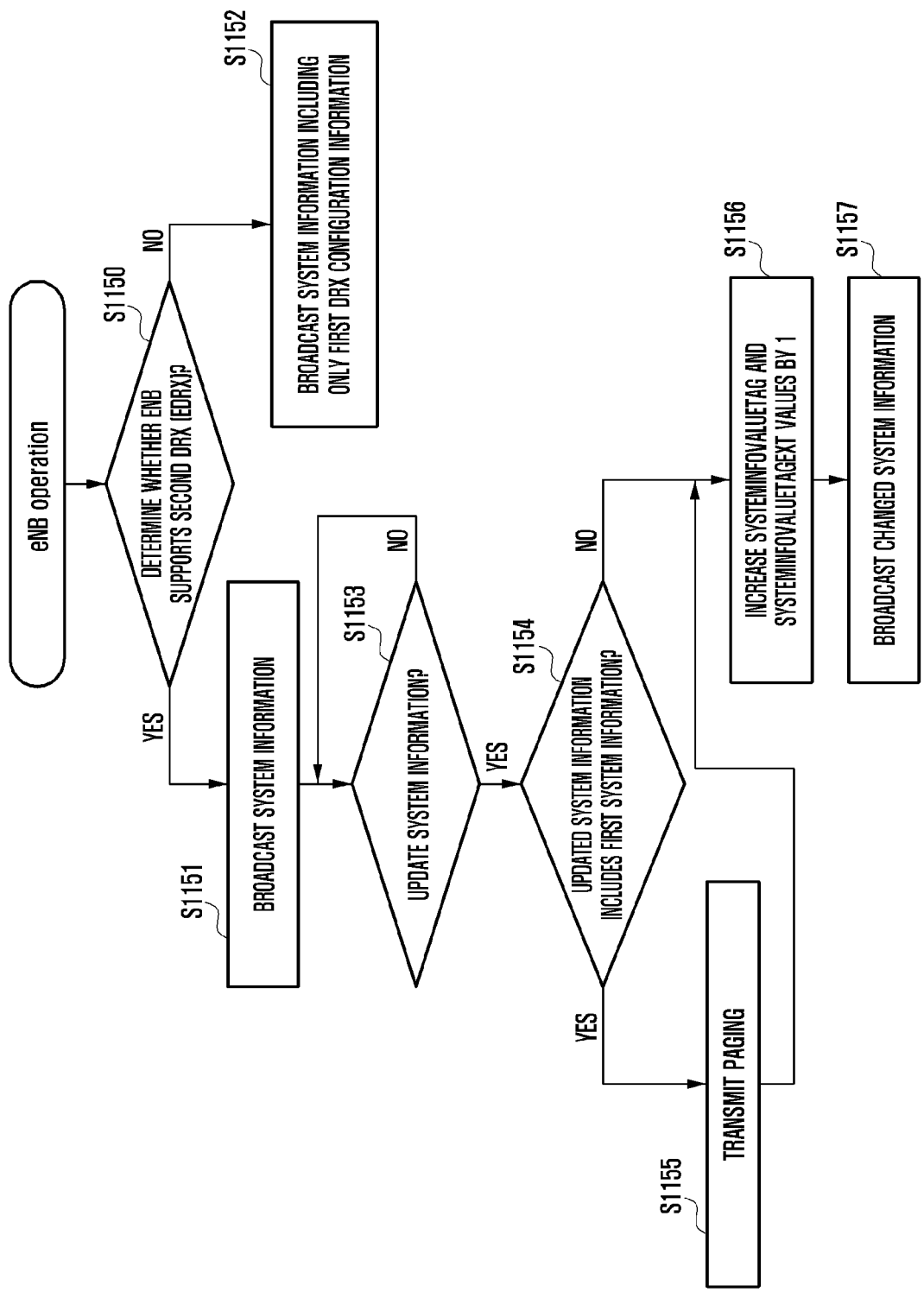
FIG. 11B is a diagram showing another operation of an eNB according to the disclosure.

FIG. 11B is a diagram showing another operation of an eNB according to the disclosure.

Referring to FIG. 11B, the eNB may determine whether it supports second DRX (eDRX) at operation S1150.

The eNB may broadcast system information at operation S1151. If the eNB supports the second DRX, the eNB may broadcast the system information, including second DRX capability information (eDRX capability), to a UE.

If the eNB does not support the second DRX, the eNB may broadcast system information including only first DRX (existing DRX) configuration information at operation S1152. If the eNB does not support the second DRX, a UE may operate according to the first DRX, and detailed contents thereof are omitted.

If the eNB supports the second DRX, the eNB may determine whether to update the system information at operation S1153.

If the system information is to be updated, the eNB may determine whether to update the system information including first system information at operation S1154.

If the system information including the first system information is to be updated, the eNB may transmit a paging message, indicating whether the system information (SI) is to be updated, to the UE at operation S1155. In this case, the eNB may transmit the paging message, including a system information change indicator, to the UE.

If the UE operates in DRX operating in a second cycle having a longer cycle than a first cycle, the eNB may transmit the paging message to the UE during a second modification period longer than a first modification period. Specifically, the eNB may determine whether the second cycle is greater than the length of the first modification period. If the second cycle is greater than the length of the first modification period, the eNB may transmit the paging message to the UE during the second modification period. Detailed contents are the same as those described above and are hereinafter omitted.

Thereafter, the eNB may increase systemInfoValueTag and systemInfoValueTagExt values by 1 at operation S1156. Alternatively, the eNB increases the systemInfoValueTag value by 1. When a wraparound occurs, the eNB may increase systemInfoValueTagExt by 1.

Furthermore, although the updated system information is not included in the first system information (i.e., if the updated system information is included in second system information related to an RRC connection), the eNB may increase the systemInfoValueTag ≄ systemInfoValueTagExt value, included in system information change-related information, by 1. Alternatively, the eNB increases the systemInfoValueTag value by 1. When a wraparound occurs, the eNB may increase systemInfoValueTagExt by 1.

Thereafter, the eNB may broadcast system information (e.g., SIB1) including the changed system information change-related information (IE value) at operation S1157. The eNB may broadcast updated system information from a given occasion (e.g., an occasion when H-SFN mod 256=0).

Accordingly, the UE may update the first system information based on the system information change indicator included in the paging message, and may determine whether to update the entire system information, including the second system information, based on the system information change-related information included in the first system information.

Figure 12:
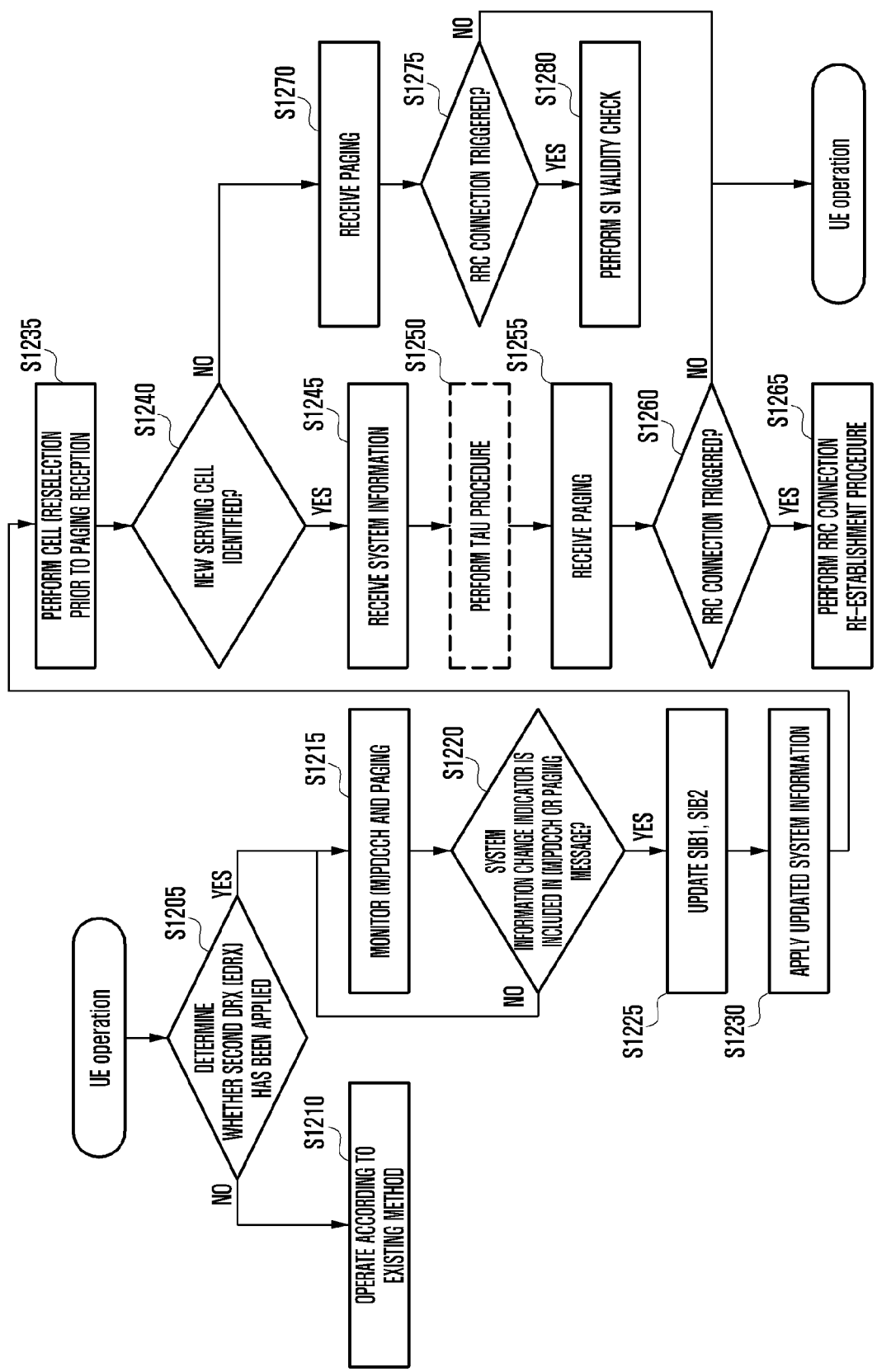
FIG. 12 is a diagram showing an operation of a UE in the disclosure.

FIG. 12 is a diagram showing an operation of a UE in the disclosure.

Referring to FIG. 12, the UE may determine whether second DRX (eDRX) has been applied at operation S1205.

If the second DRX (eDRX) has not been applied, the UE may operate according to the existing method at operation S1210. That is, the UE may operate in first DRX in a power saving mode.

If the second DRX (eDRX) is applied, the UE may monitor an (M)PDCCH and paging during a PTW period at operation S1215. In this case, an eNB may transmit a paging message in a second modification period (extended modification period). Accordingly, the UE may compare a second cycle with a first modification period, and may monitor whether a paging message is received in the second modification period if the second cycle is greater than the first modification period. Furthermore, the UE may receive a paging message in a PTW period after a second DRX cycle expires.

The UE may determine whether a system information change indicator (SI update indicator) is included in the (M)PDCCH or the paging message at operation S1220.

If system information change indicator is included in the paging message, the UE may update only an SIB1 and an SIB2 at operation S1225. The UE may update only the SIB1 and SIB2 in a second DRX acquisition period (eDRX acquisition period).

Thereafter, the UE may apply the updated system information (SI) at operation S1230.

Furthermore, the UE may perform cell (re)selection prior to the paging reception at operation S1235.

The UE that has performed the cell (re)selection may determine whether it has discovered a new serving cell at operation S1240. That is, the UE may identify whether the selected or (re)selected cell is a new serving cell. In this case, the new serving cell may mean a cell different from a current serving cell.

When the new serving cell is discovered, the UE may receive system information from the new serving cell at operation S1245. Furthermore, the UE may perform a TAU procedure, if necessary, at operation S1250.

Thereafter, the UE may receive paging from the new serving cell at operation S1255.

The UE that has received the paging may determine whether an RRC connection has been triggered at operation S1260.

If the RRC connection has been triggered, the UE may perform an RRC connection establishment procedure at operation S1265.

Meanwhile, in the disclosure, an SI validity check procedure may be omitted because the system information has been received in the cell (re)selection operation process.

Meanwhile, if, as a result of the determination at operation S1240, a new serving cell has not been discovered, the UE may receive paging at operation S1270.

The UE that has received the paging may determine whether an RRC connection has been triggered at operation S1275.

If the RRC connection has been triggered, the UE may receive an SIB1 from a selected or (re)selected cell at operation S1280, and may perform an SI validity check. Accordingly, the UE may compare stored system information change-related information with stored system information change-related information identified using the SIB1, and may update the system information if the pieces of information are different.

Meanwhile, the cell selection or (re)selection operation may not be performed. In such a case, the UE may receive paging by applying the updated system information at operation S1230.

The UE that has received the paging may determine whether an RRC connection has been triggered. If the RRC connection has been triggered, the UE may perform a validity check.

That is, as described above, the UE may compare store system information change-related information with stored system information change-related information identified using the received SIB1, and may update the entire system information including the second system information if the pieces of information are different.

Figure 13:
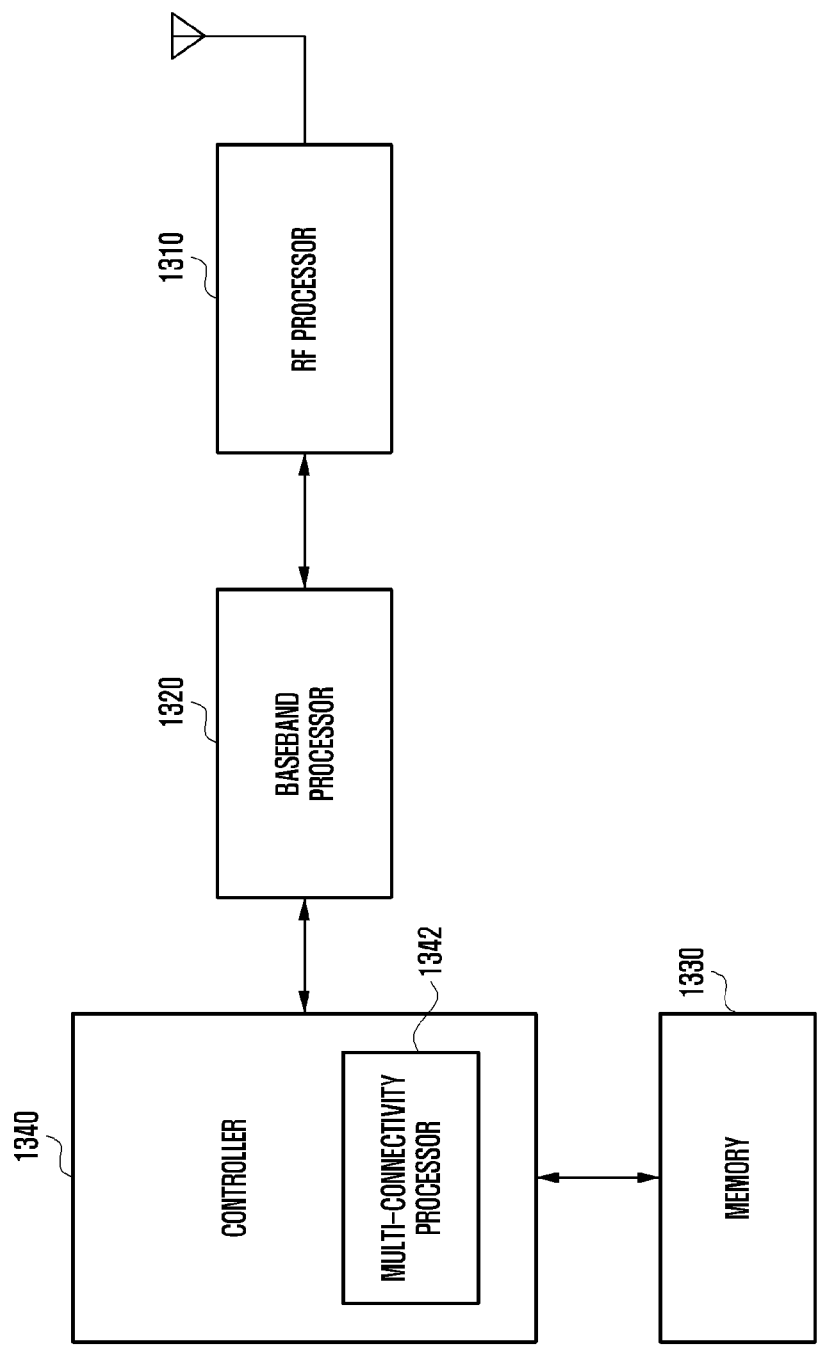
FIG. 13 is a block diagram of a UE according to the disclosure.

FIG. 13 is a block diagram of a UE according to the disclosure.

Referring to FIG. 13, the UE includes a radio frequency (RF) processor 1310, a baseband processor 1320, a memory 1330, and a controller 1340. The RF processor 1310 may perform functions for transmitting/receiving a signal through a radio channel, such as the band conversion and amplification of a signal. That is, the RF processor 1310 may up-convert a baseband signal received from the baseband processor 1320 into an RF band signal, may transmit the RF band signal through an antenna, and may down-convert an RF band signal received through the antenna into a baseband signal. For example, the RF processor 810 may include a transmission filter, a reception filter, an amplifier, a mixer, an oscillator, a digital to analog convertor (DAC), and an analog to digital convertor (ADC). In FIG. 13, only one antenna has been illustrated, but the UE may include multiple antennas. Furthermore, the RF processor 810 may include multiple RF chains. Furthermore, the RF processor 810 may perform beamforming. For the beamforming, the RF processor 810 may adjust the phase and size of each of signals transmitted and received through multiple antennas or antenna elements. The baseband processor 1320 may perform a baseband signal and inter-bit stream conversion function based on the physical layer standard of a system. For example, when data is transmitted, the baseband processor 1320 may generate complex symbols by coding and modulating a transmission bit stream. Furthermore, when data is received, the baseband processor 1320 may reconstruct a reception bit stream from a baseband signal, received from the RF processor 1310, through demodulation and decoding. For example, if an orthogonal frequency division multiplexing (OFDM) scheme is applied, when data is transmitted, the baseband processor 1320 may generate complex symbols by coding and modulating a transmission bit stream, may map the complex symbols to subcarriers, and may then configure OFDM symbols through inverse fast Fourier transform (IFFT) operation and cyclic prefix (CP) insertion. Furthermore, when data is received, the baseband processor 1320 may segment a baseband signal, received from the RF processor 1310, in an OFDM symbol unit, may reconstruct signals mapped to subcarriers through fast Fourier transform (FFT) operation, and may reconstruct a reception bit stream through demodulation and decoding. The baseband processor 1320 and the RF processor 1310 may transmit and receive signals as described above. Accordingly, the baseband processor 1320 and the RF processor 1310 may be called a transmitter, a receiver, a transceiver or a communication unit. Furthermore, at least one of the baseband processor 1320 and the RF processor 1310 may include multiple communication modules in order to support multiple different radio access technologies. Furthermore, at least one of the baseband processor 1320 and the RF processor 1310 may include different communication modules in order to process signals of different frequency bands. For example, the different radio access technologies may include a wireless LAN (e.g., IEEE 802.11), a cellular network (e.g., LTE), etc. Furthermore, the different frequency bands may include a super high frequency (SHF) (e.g., 2.5 GHz, 5 GHz) band and a millimeter wave (e.g., 60 GHz) band. The memory 830 may store data, such as a basic program, an application program, and configuration information for the operation of the UE. In particular, the memory 1330 may store information related to an access node that performs wireless communication using a second radio access technology. Furthermore, the memory 1330 may provide stored data in response to a request from the controller 1340. The controller 1340 may control an overall operation of the UE. For example, the controller 1340 may transmit and receive signals through the baseband processor 1320 and the RF processor 1310. Furthermore, the controller 1340 writes data in the memory 1340 and reads data from the memory 1340. To this end, the controller 1340 may include at least one processor. For example, the controller 1340 may include a communication processor (CP) performing control for communication and an application processor (AP) controlling a higher layer, such as an application program. According to an embodiment of the disclosure, the controller 1340 may control the UE to perform the illustrated operations and procedures of the UE.

Specifically, the controller 1340 may determine whether second DRX (eDRX) has been applied. If the second DRX (eDRX) has not been applied, the controller 1340 may operate according to the existing method. That is, the controller 1340 may operate as first DRX in a power saving mode.

If the second DRX (eDRX) is applied, the controller 1340 may monitor an (M)PDCCH and paging during a PTW period. In this case, a base station may transmit a paging message in a second modification period (extended modification period). Accordingly, the controller 1340 may compare a second cycle with a first modification period. If the second cycle is greater than the first modification period, the controller may monitor whether a paging message is received the second modification period. Furthermore, the controller 1340 may receive a paging message in a PTW period after the second DRX cycle expires.

The controller 1340 may determine whether a system information change indicator (SI update indicator) is included in the (M)PDCCH or the paging message.

If the system information change indicator is included in the paging message, the controller 1340 may update only an SIB1 and an SIB2. The controller 1340 may update only the SIB1 and SIB2 in a second DRX acquisition period (eDRX acquisition period).

Thereafter, the controller 1340 may apply updated system information (SI).

Furthermore, the controller 1340 may perform cell (re) selection prior to the paging reception.

After the cell (re)selection is performed, the controller 1340 may determine whether a new serving cell has been discovered. That is, the UE may identify whether the selected or (re)selected cell is a new serving cell. In this case, the new serving cell may mean a cell different from a current serving cell.

When the new serving cell is discovered, the controller 1340 may receive system information from the new serving cell. Furthermore, the controller 1340 may perform a TAU procedure, if necessary.

Thereafter, the controller 1340 may receive paging from the new serving cell.

The controller 1340 that has received the paging may determine whether an RRC connection has been triggered. If the RRC connection has been triggered, the controller 1340 may perform an RRC connection establishment procedure.

Meanwhile, in the disclosure, the controller 1340 may omit an SI validity check procedure because the system information has been received in the above cell (re)selection operation process.

Meanwhile, if as a result of the determination, a new serving cell has not been discovered, the controller 1340 may receive paging.

The controller 1340 that has received the paging may determine whether an RRC connection has been triggered.

If the RRC connection is triggered, the controller 1340 may receive an SIB1 from a selected or (re)selected cell and perform an SI validity check. Accordingly, the controller 1340 may compare store system information change-related information with stored system information change-related information identified using the received SIB1, and may update the system information if the pieces of information are different.

Meanwhile, the cell selection or (re)selection operation may not be performed. In such a case, the controller 1340 may receive paging by applying the updated system information.

The controller 1340 that has received the paging may determine whether an RRC connection has been triggered. If the RRC connection has been triggered, the UE may perform a validity check.

That is, as described above, the controller 1340 may compare store system information change-related information with stored system information change-related information identified using a received SIB1, and may update the entire system information, including the second system information, if the pieces of information are different.

Figure 14:
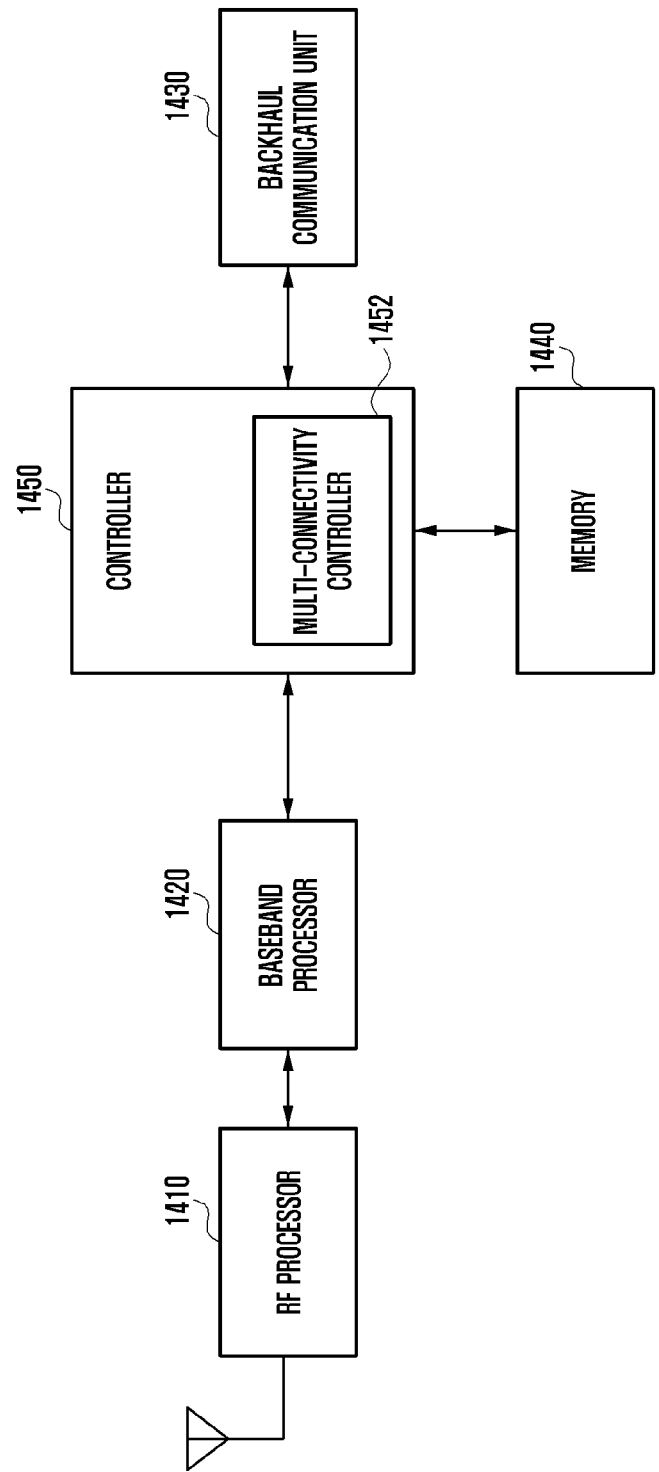
FIG. 14 is a diagram showing the configuration of an eNB according to the disclosure.

FIG. 14 is a diagram showing the configuration of an eNB according to the disclosure.

As shown in FIG. 14, the eNB may include an RF processor 1410, a baseband processor 1420, a backhaul communication unit 1430, a memory 1440 and a controller 1450. The RF processor 1410 may perform a function for transmitting/receiving a signal through a radio channel, such as the band conversion and amplification of a signal. That is, the RF processor 1410 may up-convert a baseband signal received from the baseband processor 1420 into an RF band signal, may transmit the RF band signal through an antenna, and may down-convert an RF band signal received through the antenna into a baseband signal. For example, the RF processor 1410 may include a transmission filter, a reception filter, an amplifier, a mixer, an oscillator, a DAC, and an ADC. In FIG. 14, only one antenna has been illustrated, but the first access node may include multiple antennas. Furthermore, the RF processor 1410 may include multiple RF chains. Furthermore, the RF processor 1410 may perform beamforming. For the beamforming, the RF processor 1410 may adjust the phase and size of each of signals transmitted and received multiple antennas or antenna elements. The baseband processor 1420 may perform a baseband signal and inter-bit stream conversion function based on the physical layer standard of a first radio access technology. For example, when data is transmitted, the baseband processor 1420 may generate complex symbols by coding and modulating a transmission bit stream. Furthermore, when data is received, the baseband processor 1420 may reconstruct a reception bit stream from a baseband signal received from the RF processor 1410 through demodulation and decoding. For example, if the OFDM scheme is applied, when data is transmitted, the baseband processor 1420 may generate complex symbols by coding and modulating a transmission bit stream, may map the complex symbols to subcarriers, and may configure OFDM symbols through IFFT operation and CP insertion. Furthermore, when data is received, the baseband processor 1420 may segment a baseband signal received from the RF processor 1410 in an OFDM symbol unit, may reconstruct signals mapped to subcarriers through FFT operation, and may then reconstruct a reception bit stream through demodulation and decoding. The baseband processor 1420 and the RF processor 1410 may transmit and receive signals as described above. Accordingly, the baseband processor 1420 and the RF processor 1410 may be called a transmitter, a receiver, a transceiver, a backhaul communication unit or a wireless communication unit. The backhaul communication unit 1430 may provide an interface for performing communication with other nodes within a network. That is, the backhaul communication unit 1430 may convert a bit stream, transmitted from a main eNB to other nodes, for example, an assistant eNB or a core network, into a physical signal, and may convert a physical signal, received from the other nodes, into a bit stream. The memory 1440 may store data, such as a basic program, an application program, and configuration information for the operation of the main eNB. Specifically, the memory 1440 may store information on a bearer allocated to an accessed UE and measurement results reported by an accessed UE. Furthermore, the memory 1440 may store information, that is, a criterion by which whether to provide a UE with multi-connectivity or whether to stop multi-connectivity is determined. Furthermore, the memory 1440 may provide stored data in response to a request from the controller 1450. The controller 1450 may control an overall operation of the main eNB. For example, the controller 1450 may transmit and receive signals through the baseband processor 1420 and the RF processor 1410 or through the backhaul communication unit 1430. Furthermore, the controller 1450 writes data in the memory 1440 and reads data from the memory 1440. To this end, the controller 1450 may include at least one processor.

According to an embodiment of the disclosure, the controller 1450 may include a multi-connectivity controller 1452 performing control for providing multi-connectivity to a UE. For example, the controller 1450 may control the main eNB to perform the illustrated operations and procedures of the eNB.

Specifically, the controller 1450 may determine whether the eNB supports second DRX (eDRX). The controller 1450 may broadcast system information. If the controller 1450 supports the second DRX, the controller 1450 may broadcast the system information, including second DRX capability information (eDRX capability), to a UE.

If the controller 1450 does not support the second DRX, the controller 1450 may broadcast the system information including only first DRX (existing DRX) configuration information. If the controller 1450 does not support the second DRX, a UE may operate according to the first DRX, and detailed contents thereof are omitted.

If the controller 1450 supports the second DRX, the controller 1450 may determine whether to update the system information.

If the controller 1450 supports the second DRX, the controller 1450 may determine whether to update the system information.

If the system information including the first system information is to be updated, the controller 1450 may transmit a paging message, indicating whether the system information (SI) is to be updated, to the UE. In this case, the controller 1450 may transmit the paging message, including a system information change indicator, to the UE.

If the UE operates in DRX operating in a second cycle having a longer cycle than a first cycle, the controller 1450 may transmit the paging message to the UE during a second modification period longer than a first modification period. Specifically, the controller 1450 may determine whether the second cycle is greater than the length of the first modification period. If the second cycle is greater than the length of the first modification period, the controller 1450 may transmit the paging message to the UE during the second modification period. Detailed contents are the same as those described above and are hereinafter omitted.

Thereafter, the controller 1450 may increase systemInfoValueTag and systemInfoValueTagExt values by 1. Alternatively, the controller 1450 increases the systemInfoValueTag value by 1. When a wraparound occurs, the controller 1450 may increase systemInfoValueTagExt by 1.

Furthermore, although the updated system information is not included in the first system information (i.e., if the updated system information is included in second system information related to an RRC connection), the controller 1450 may increase the systemInfoValueTag or systemInfoValueTagExt value, included in system information change-related information, by 1. Alternatively, the controller 1450 increases the systemInfoValueTag value by 1. When a wraparound occurs, the controller 1450 may increase systemInfoValueTagExt by 1.

Thereafter, the controller 1450 may broadcast system information (e.g., SIB1) including the changed system information change-related information (IE value). The controller 1450 may broadcast updated system information from a given occasion (e.g., an occasion when H-SFN mod 256=0).

Accordingly, the UE may update the first system information based on the system information change indicator included in the paging message, and may determine whether to update the entire system information, including the second system information, based on the system information change-related information included in the first system information.

Furthermore, if the eNB supports the second DRX, the controller 1450 may determine whether the eNB supports a coverage extension function in the MTC technology.

If the eNB does not support the coverage extension function in the MTC technology, the controller 1450 may determine whether the changed system information includes at least paging control channel configuration information (pcch-config).

If the changed system information includes paging control channel configuration information, the controller 1450 may transmit a paging message or PDCCH, including a system information change indicator (or SI update indicator), to the UE in order to notify the UE whether to update the SI through the paging message.

In contrast, if the changed system information does not include paging control channel configuration information, the process may be omitted.

Thereafter, the controller 1450 may broadcast the updated system information in a next second DRX acquisition period (eDRX acquisition period). In this case, the controller 1450 may broadcast the updated system information at an occasion when H-SFN mod 256=0 is satisfied.

Meanwhile, if the eNB supports the coverage extension function in the MTC technology, the controller 1450 may determine whether the changed system information includes at least one of paging channel configuration information (pcch-config), subframe bitmap-related information (fdd-DownlinkOrTddSubframeBitmapLC-r13), and hopping-related information (si-HoppingConfigCommon-r13).

If at least one of the pieces of information is included in the changed system information, the controller 1450 may transmit a paging message or (M)PDCCH, including a system information change indicator (SI update indicator), to the UE in order to notify the UE whether to update the SI through the paging message.

However, if at least one of the pieces of information is not included in the changed system information, the controller 1450 may omit the process.

Thereafter, the controller 1450 may broadcast the updated system information in a next second DRX acquisition period (eDRX acquisition period). In this case, the controller 1450 may broadcast the updated system information at an occasion when H-SFN mod 256=0 is satisfied.

Meanwhile, the preferred embodiments of the disclosure have been disclosed in this specification and drawings. Although specific terms have been used, they are used in common meanings in order to easily describe the technical contents of the disclosure and to help understanding of the disclosure, but are not intended to limit the scope of the disclosure. It is evident to a person having ordinary skill in the art to which the disclosure pertains that other changed examples based on the technical spirit of the disclosure are possible in addition to the disclosed embodiments.

The invention claimed is:

1. A method performed by a terminal, in which an extended discontinuous reception (eDRX) is configured, in a wireless communication system, the method comprising:
   receiving, from a base station, a first paging message in an extended modification period;
   identifying whether a system information change indicator indicating that first system information among a plurality of system information is to be changed is included in the first paging message;
   receiving, from the base station, changed first system information in a next extended modification period in case that the system information change indicator is included in the first paging message; and
   receiving, from the base station, a second paging message for a radio resource control (RRC) connection establishment based on the changed first system information,
   wherein a first value tag stored in the terminal is not changed in case that the first system information is changed, and
   wherein the first value tag is used to identify whether to update second system information in case that the RRC connection establishment is triggered.

2. The method of claim 1, further comprising:
   comparing the first value tag stored in the terminal with a second value tag included in the changed first system information in case that the RRC connection establishment is triggered; and
   updating the second system information in case that the first value tag is different from the second value tag,
   wherein the changed first system information includes at least one of a system information block 1 (SIB1) or a system information block 2 (SIB2), and
   wherein the second system information is associated with the RRC connection establishment.

3. The method of claim 1, wherein receiving the first paging message comprises:
determining whether a cycle of the eDRX is greater than a length of a modification period; and
receiving, from the base station, the first paging message in the extended modification period in case that the cycle of the eDRX is greater than the length of the modification period.

4. The method of claim 1, wherein receiving the second paging message comprises:
receiving, from the base station, the second paging message based on the changed first system information in case that a serving cell is not changed;
identifying whether the RRC connection establishment is triggered based on the second paging message; and
determining whether to update the second system information based on a validity check in case that the RRC connection establishment is triggered.

5. A method performed by a base station in a wireless communication system, the method comprising:
identifying whether to change first system information among a plurality of system information;
in case that the first system information is identified to be changed, transmitting, to a terminal in which an extended discontinuous reception (eDRX) is configured, a first paging message including a system information change indicator indicating the first system information is to be changed, the first paging message being transmitted in an extended modification period;
transmitting, to the terminal, changed first system information in a next extended modification period; and
transmitting, to the terminal, a second paging message for a radio resource control (RRC) connection establishment based on the changed first system information,
wherein a first value tag stored in the terminal is not changed in case that the first system information is changed, and
wherein the first value tag is used to identify whether to update second system information in case that the RRC connection establishment is triggered.

6. The method of claim 5, wherein transmitting the second paging message comprises:
transmitting, to the terminal, the second paging message based on the changed first system information in case that a serving cell is not changed,
wherein the second paging message is used to identify whether the RRC connection establishment is triggered, and
wherein whether the second system information is to be updated is determined based on a validity check in case that the RRC connection establishment is triggered.

7. The method of claim 5, wherein in case that the RRC connection establishment is triggered, the first value tag stored in the terminal is compared with a second value tag included in the changed first system information,
wherein in case that the first value tag is different from the second value tag, the second system information is updated,
wherein the changed first system information includes at least one of a system information block 1 (SIB1) or a system information block 2 (SIB2), and
wherein the second system information is associated with the RRC connection establishment.

8. The method of claim 5, wherein transmitting the first paging message comprises:
determining whether a cycle of the eDRX is greater than a length of a modification period; and
transmitting, to the terminal, the first paging message in the extended modification period in case that the cycle of the eDRX is greater than the length of the modification period.

9. A terminal, in which an extended discontinuous reception (eDRX) is configured, in a wireless communication system, the terminal comprising:
a transceiver; and
a controller coupled with the transceiver and configured to:
control the transceiver to receive, from a base station, a first paging message in an extended modification period,
identify whether a system information change indicator indicating that first system information among a plurality of system information is to be changed is included in the first paging message,
control the transceiver to receive, from the base station, changed first system information in a next extended modification period in case that the system information change indicator is included in the first paging message, and
control the transceiver to receive, from the base station, a second paging message for a radio resource control (RRC) connection establishment based on the changed first system information,
wherein a first value tag stored in the terminal is not changed in case that the first system information is changed, and
wherein the first value tag is used to identify whether to update second system information in case that the RRC connection establishment is triggered.

10. The terminal of claim 9, wherein the controller is further configured to:
compare the first value tag stored in the terminal with a second value tag included in the changed first system information in case that the RRC connection establishment is triggered, and
update the second system information in case that the first value tag is different from the second value tag,
wherein the changed first system information includes at least one of a system information block 1 (SIB1) or a system information block 2 (SIB2), and
wherein the second system information is associated with the RRC connection establishment.

11. The terminal of claim 9, wherein the controller is configured to:
determine whether a cycle of the eDRX is greater than a length of a modification period; and
control the transceiver to receive, from the base station, the first paging message in the extended modification period in case that the cycle of the eDRX is greater than the length of the modification period.

12. The terminal of claim 9, wherein the controller is configured to:
control the transceiver to receive, from the base station, the second paging message based on the changed first system information in case that a serving cell is not changed,
identify whether the RRC connection establishment is triggered based on the second paging message, and
determine whether to update the second system information based on a validity check in case that the RRC connection establishment is triggered.

13. A base station in a wireless communication system, the base station comprising:
a transceiver; and
a controller coupled with the transceiver and configured to:
identify whether to change first system information among a plurality of system information,
in case that the first system information is identified to be changed, control the transceiver to transmit, to a terminal in which an extended discontinuous reception (eDRX) is configured, a first paging message including a system information change indicator indicating the first system information is to be changed, the first paging message being transmitted in an extended modification period,
control the transceiver to transmit, to the terminal, changed first system information in a next extended modification period, and
control the transceiver to transmit, to the terminal, a second paging message for a radio resource control (RRC) connection establishment based on the changed first system information,
wherein a first value tag stored in the terminal is not changed in case that the first system information is changed, and
wherein the first value tag is used to identify whether to update second system information in case that the RRC connection establishment is triggered.

14. The base station of claim 13, wherein the controller is configured to:
control the transceiver to transmit, to the terminal, the second paging message based on the changed first system information in case that a serving cell is not changed,
wherein the second paging message is used to identify whether the RRC connection establishment is triggered, and
wherein whether the second system information is to be updated is determined based on a validity check in case that the RRC connection establishment is triggered.

15. The base station of claim 13, wherein in case that the RRC connection establishment is triggered, the first value tag stored in the terminal is compared with a second value tag included in the changed first system information,
wherein in case that the first value tag is different from the second value tag, the second system information is updated,
wherein the changed first system information includes at least one of a system information block 1 (SIB1) or a system information block 2 (SIB2), and
wherein the second system information is associated with the RRC connection establishment.

16. The base station of claim 13, wherein the controller is configured to:
determine whether a cycle of the eDRX is greater than a length of a modification period, and
control the transceiver to transmit, to the terminal, the first paging message in the extended modification period in case that the cycle of the eDRX is greater than the length of the modification period.

* * * * *